(12) United States Patent
Sabo et al.

(10) Patent No.: US 10,837,072 B2
(45) Date of Patent: Nov. 17, 2020

(54) SPLINED POWER TRANSMISSION COMPONENTS MADE USING HEAT-ASSISTED CALIBRATION PROCESS AND METHOD OF FORMING SUCH SPLINED POWER TRANSMISSION COMPONENTS

(71) Applicant: Magna Powertrain Inc., Concord (CA)

(72) Inventors: John Richard Sabo, Caledon (CA); Sokol Sulaj, Etobicoke (CA); David Victor Dorigo, Oakville (CA)

(73) Assignee: MAGNA POWERTRAIN INC., Concord (CA)

(*) Notice: Subject to any disclaimer, the term of this patent is extended or adjusted under 35 U.S.C. 154(b) by 231 days.

(21) Appl. No.: 15/678,611

(22) Filed: Aug. 16, 2017

(65) Prior Publication Data

US 2018/0057903 A1 Mar. 1, 2018

Related U.S. Application Data

(60) Provisional application No. 62/380,531, filed on Aug. 29, 2016.

(51) Int. Cl.
*C21D 9/00* (2006.01)
*B21D 53/28* (2006.01)
(Continued)

(52) U.S. Cl.
CPC .......... *C21D 9/0068* (2013.01); *B21D 53/28* (2013.01); *B21J 5/12* (2013.01); *B21K 1/26* (2013.01);
(Continued)

(58) Field of Classification Search
CPC ........ C21D 9/0068; C21D 1/18; C21D 1/673; B21D 53/28; B21J 5/12; B21K 1/26
See application file for complete search history.

(56) References Cited

U.S. PATENT DOCUMENTS

| 3,378,412 A * | 4/1968 | Mansfield | ................ C21D 9/40 |
| | | | 148/589 |
| 4,393,563 A * | 7/1983 | Smith | ....................... B22F 3/16 |
| | | | 29/898.066 |

(Continued)

FOREIGN PATENT DOCUMENTS

| DE | 10333166 A1 | 2/2005 |
| EP | 2429733 B1 | 4/2014 |

(Continued)

OTHER PUBLICATIONS

Office Action dated Aug. 7, 2018 in corresponding German Patent Application No. 10 2017 214 561.7.

*Primary Examiner* — Stanley S Silverman
*Assistant Examiner* — Ricardo D Morales
(74) *Attorney, Agent, or Firm* — Dickinson Wright PLLC

(57) ABSTRACT

A method for forming a component utilizing ultra-high strength steel and components formed by the method. The method includes the step of providing a flat blank of ultra-high strength 22MnB5 steel. The next step of the method is cold forming the flat blank into an unfinished shape of a component while the blank is in an unhardened state. Then, heating the unfinished shape of the component and generating a spline form thereon. The method proceeds by forming a finished shape of the component using a quenching die resulting in a fine-grained martensitic component material structure and enabling net shape processing to establish final geometric dimensions of the component.

17 Claims, 24 Drawing Sheets

(51) Int. Cl.
*B21J 5/12* (2006.01)
*B21K 1/26* (2006.01)
*C21D 1/18* (2006.01)
*C21D 1/673* (2006.01)
*B21D 35/00* (2006.01)

(52) U.S. Cl.
CPC ............... *C21D 1/18* (2013.01); *C21D 1/673* (2013.01); *B21D 35/005* (2013.01); *F16D 2200/0021* (2013.01); *F16D 2200/0082* (2013.01); *F16D 2250/0023* (2013.01); *F16D 2250/0053* (2013.01)

(56) References Cited

U.S. PATENT DOCUMENTS

| | | | |
|---|---|---|---|
| 8,127,449 B2 * | 3/2012 | Bayer | B21D 35/00 29/897.2 |
| 2004/0250593 A1 * | 12/2004 | Takagi | B21D 22/14 72/340 |
| 2010/0126020 A1 * | 5/2010 | Deriaz | B21J 5/12 29/893.34 |
| 2012/0030929 A1 * | 2/2012 | Merklein | C21D 7/13 29/592 |
| 2013/0205863 A1 | 8/2013 | Loesch | |
| 2016/0001342 A1 | 1/2016 | Hansen et al. | |

FOREIGN PATENT DOCUMENTS

| | | | | |
|---|---|---|---|---|
| EP | 2848709 A1 | 3/2015 | | |
| WO | WO2005021821 A1 | 3/2005 | | |
| WO | WO-2015143537 A1 * | 10/2015 | ............ | B21D 53/28 |
| WO | WO2015143537 A1 | 10/2015 | | |

* cited by examiner

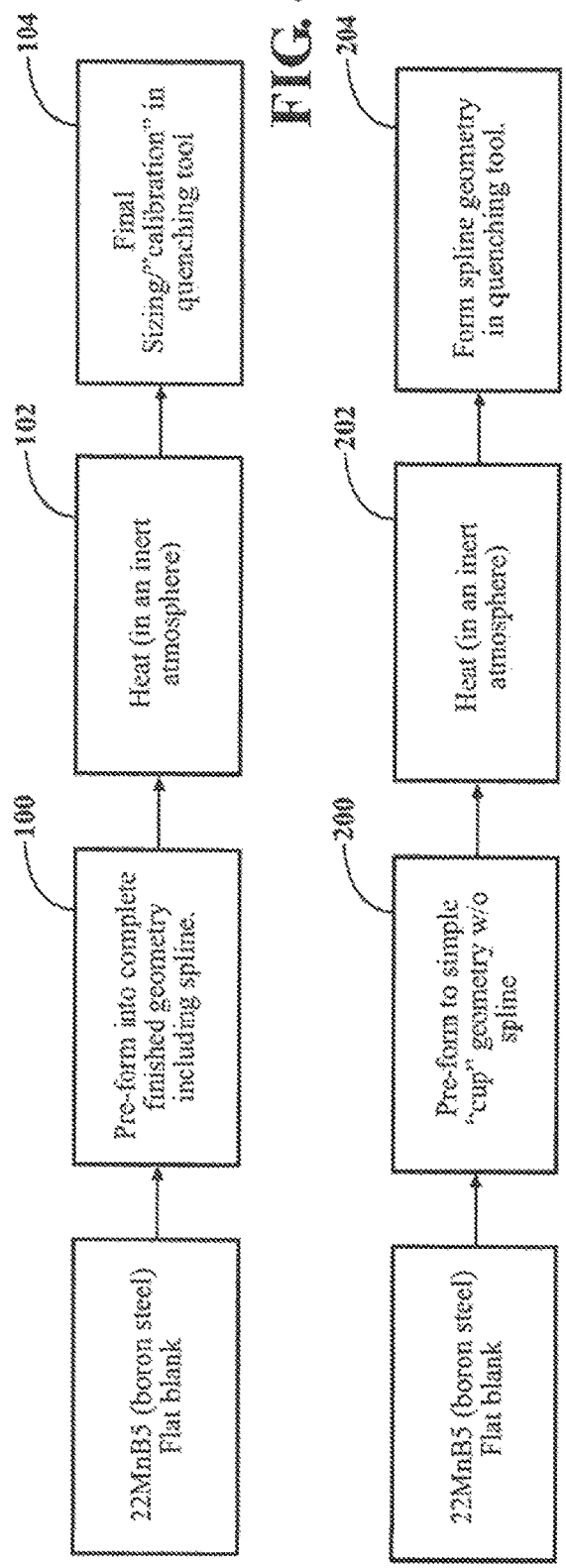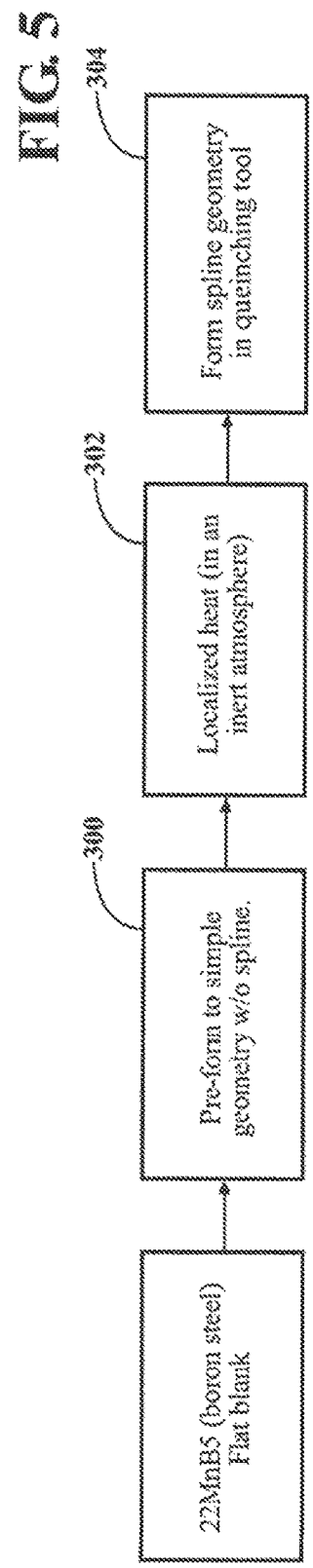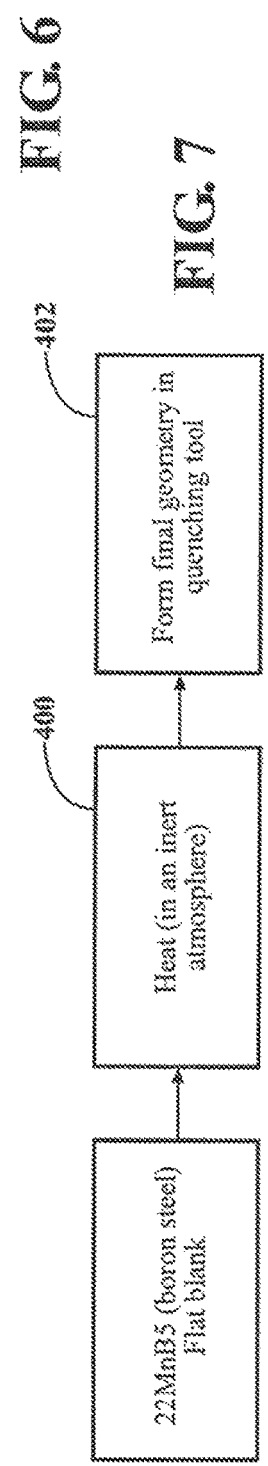

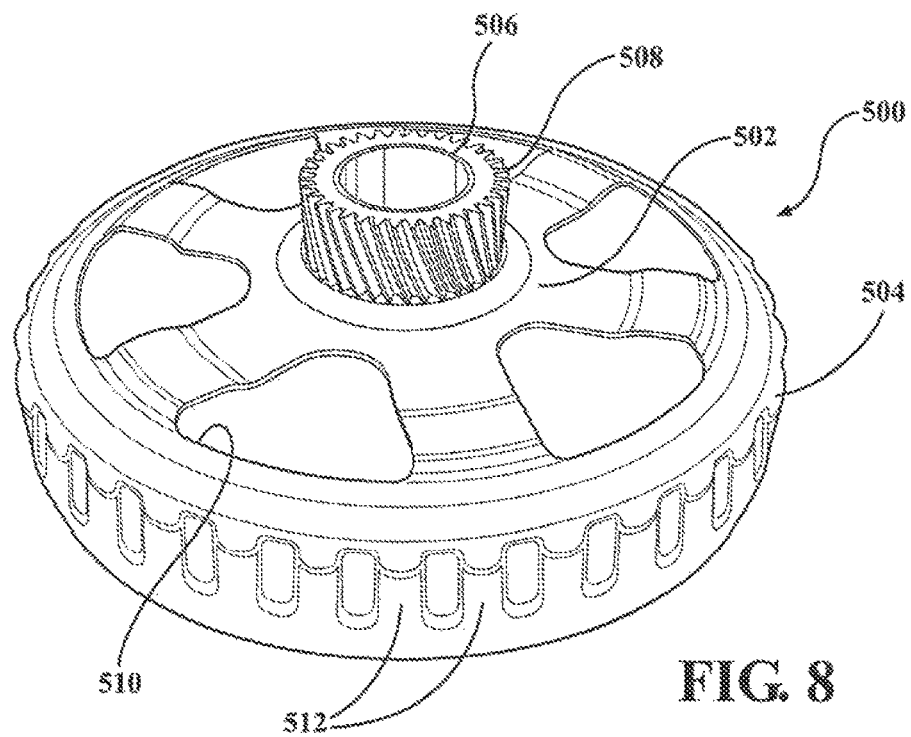
FIG. 8
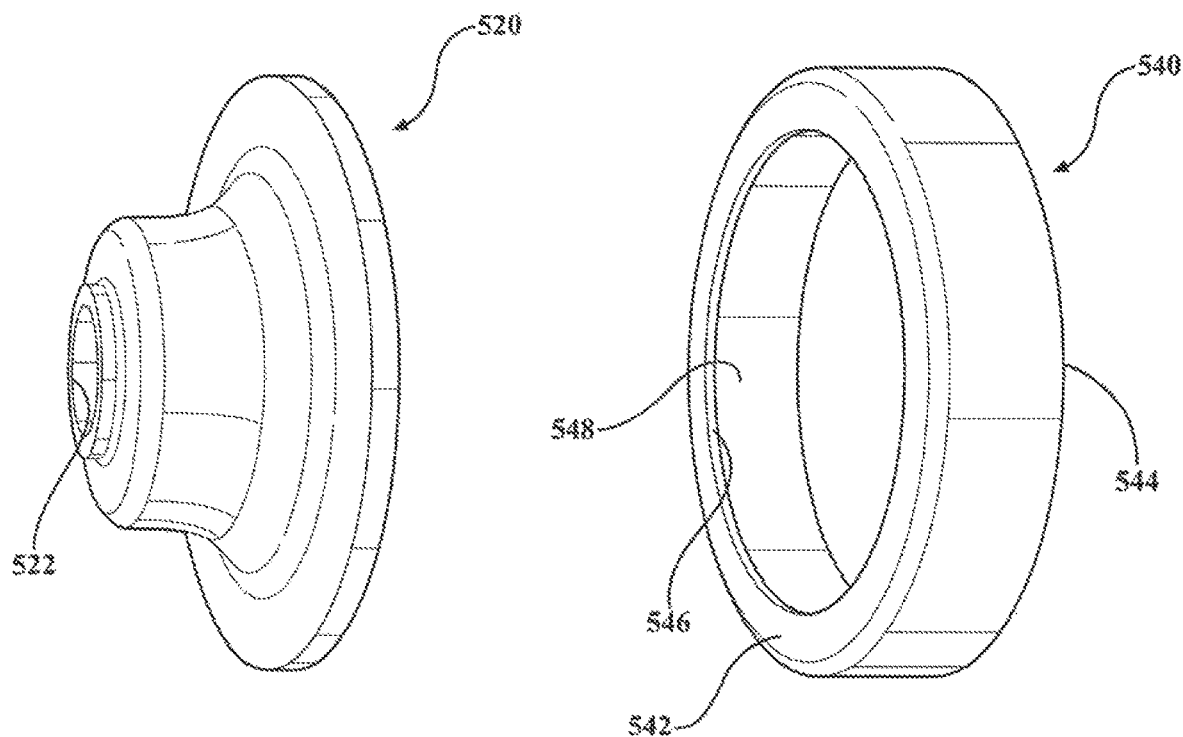
FIG. 9
FIG. 10

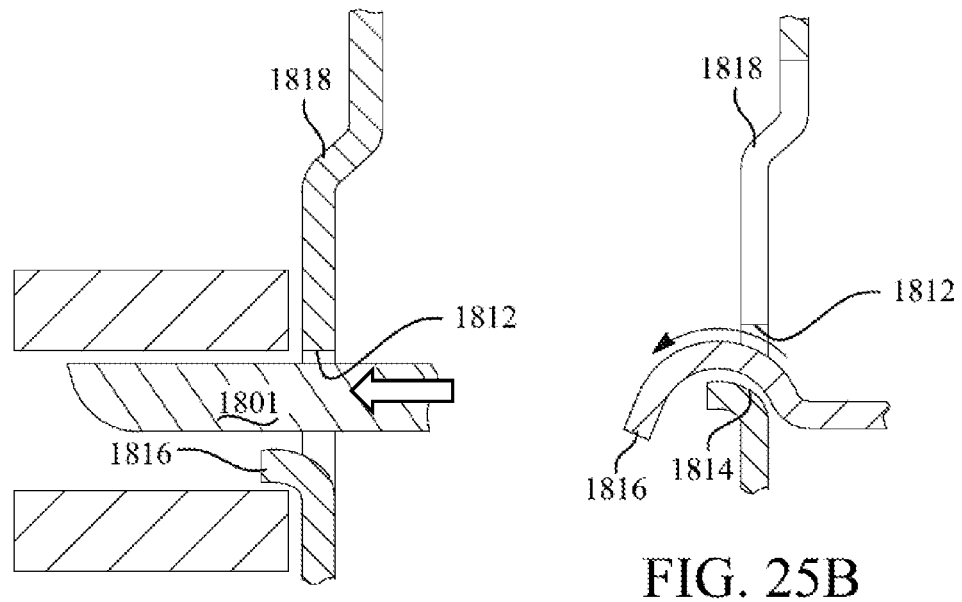
FIG. 25A
FIG. 25B
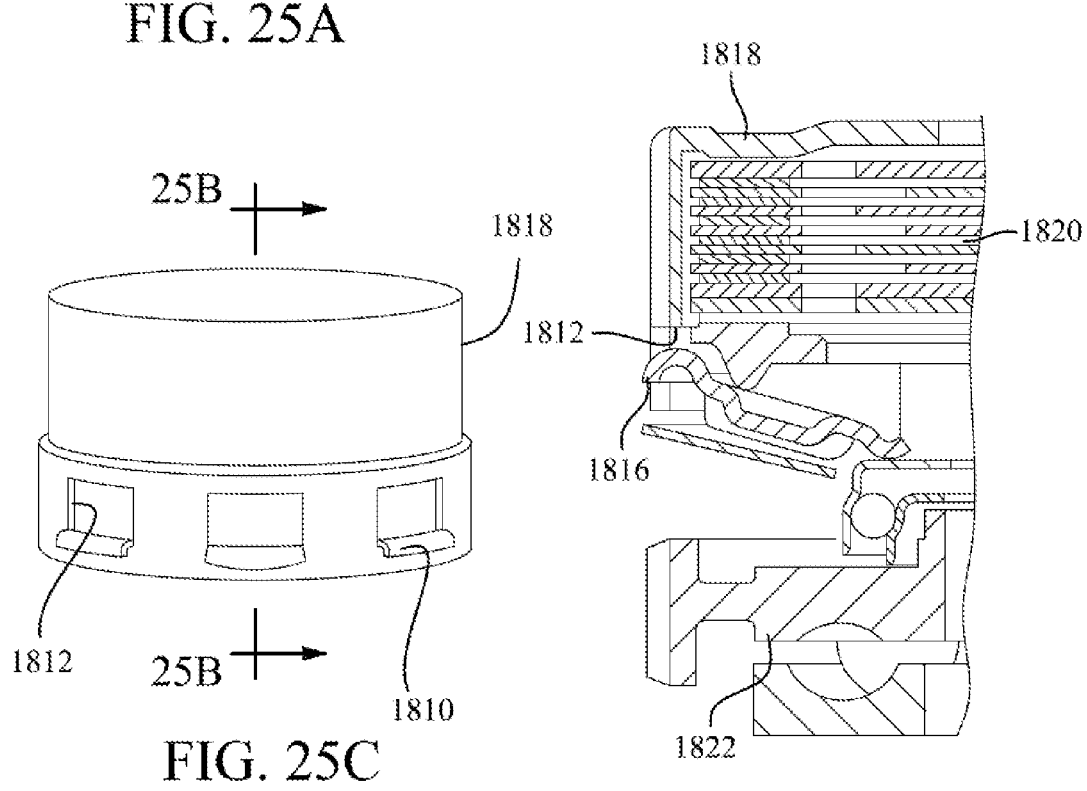
FIG. 25C
FIG. 25D

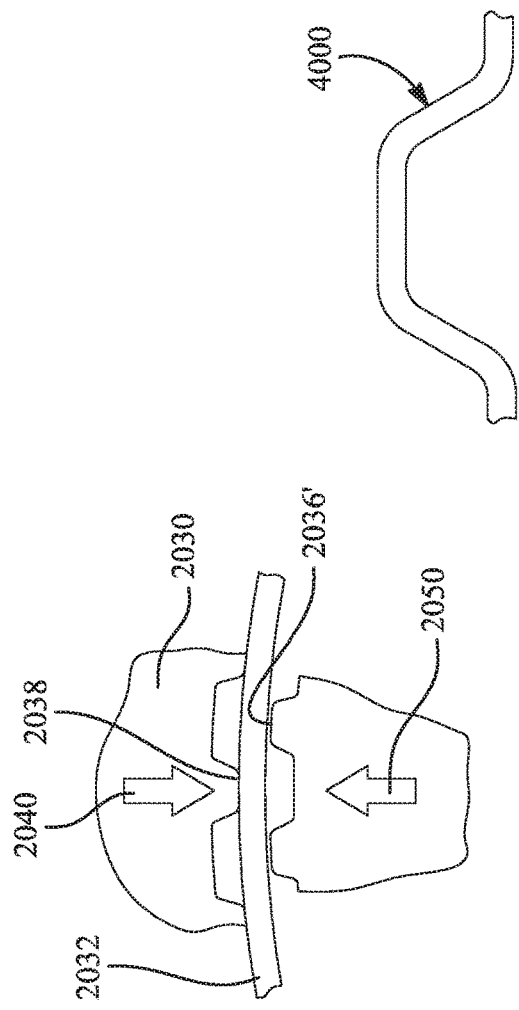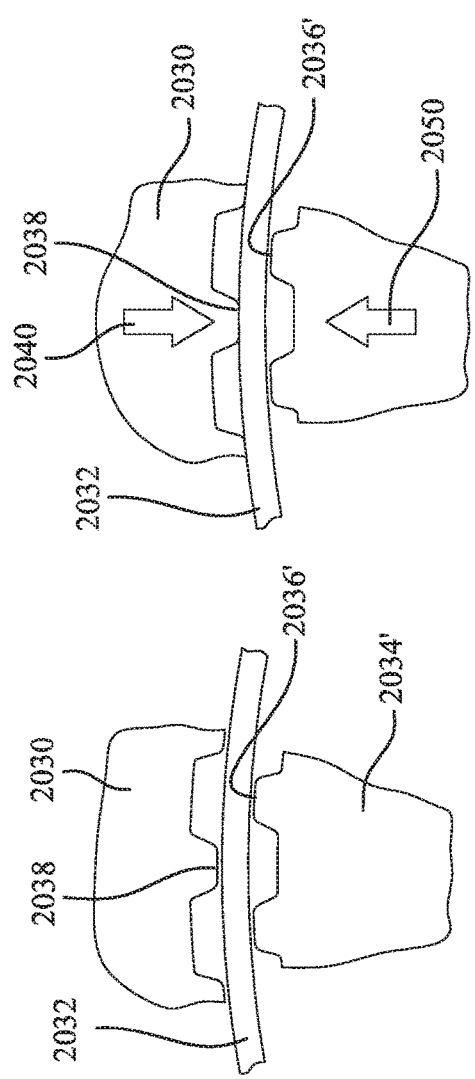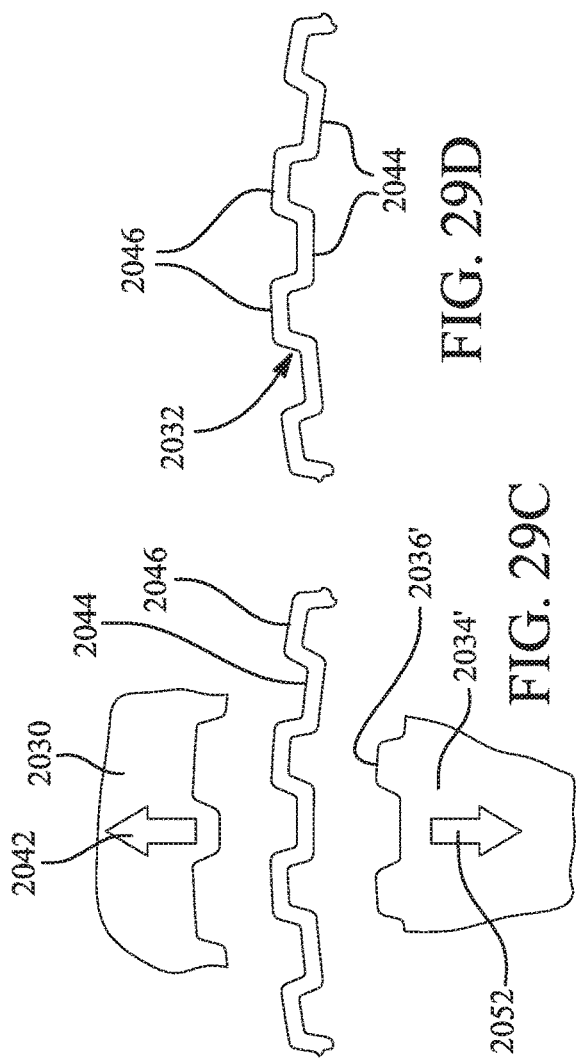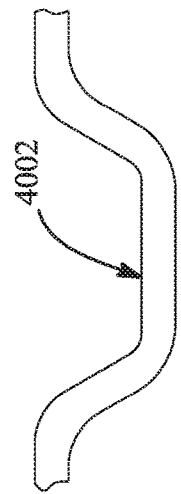

SPLINED POWER TRANSMISSION COMPONENTS MADE USING HEAT-ASSISTED CALIBRATION PROCESS AND METHOD OF FORMING SUCH SPLINED POWER TRANSMISSION COMPONENTS

CROSS REFERENCE TO RELATED APPLICATIONS

This application claims the benefit of, and priority to, U.S. Provisional Application Ser. No. 62/380,531 filed Aug. 29, 2016, the entire disclosure of which is incorporated herein by reference.

BACKGROUND

The present disclosure relates generally to components formed from ultra-high strength steel, such as boron steel, and method of forming the same.

There is a high demand in the automotive industry to reduce weight of vehicles in order to increase their efficiency and reduce fuel consumption. The challenges of meeting fuel economy and CO2 emission targets by using light-weight materials and technologies are not only the focus of body/structure and engine but extend into the automatic transmission applications as well.

Ultra-high strength steel is currently used in building construction and static automotive structures (e.g. vehicle bodies and frames). The use of ultra-high strength steel generally allows the weights of these structures to be reduced. Additionally, in automotive structures, the ultra-high strength steel enables the absorption of impact energy and minimizes intrusion into occupant seating areas. Although ultra-high strength steel can be made extremely strong, other properties such as formability, weldability, and impact toughness may be negatively affected, resulting in structures which may be more prone to cracking and fracture.

Automatic transmissions use a number of power transmission or "torque transmitting" components for transmitting torque between components. For example, power transmission components for automotive vehicles, such as clutch assemblies having clutch plates within a clutch housing and clutch hub, are well-known. Such clutch housings have a generally cylindrical or cup-shaped body and an open end. The cylindrical or cup-shaped body is formed from a sheet metal blank and has a plurality of torque transmitting features, such as spline teeth, formed thereon. The clutch plates fit within the clutch housing and engage the spline teeth. The clutch hub can also be a formed sheet metal component and is typically connected to a transmission shaft.

Powertrain components including clutch housings and hubs are commonly made of aluminum or high strength low-alloy steel (HSLA) rather than ultra-high strength steel, such as boron steel. Aluminum or HSLA steel is used primarily because of its formability. Specifically, these types of materials are high strength materials which can achieve a specific geometric dimension or shape and have a specific tolerance required. Consequently, aluminum or HSLA may be used in powertrain components including parts of an automatic transmission easily, efficiently, and at a low-cost.

Typically, components such as reaction shells, clutch housings, and hubs made of aluminum or HSLA are formed using one or a combination of cold-forming or stamping processes and thermal heat treatments to obtain the desired shape, performance, and strength characteristics. Additionally, the structures such as the plurality of spline teeth of the clutch housing may be formed easily by using a series of rollers. Similar processes also may be used to form other powertrain components such as planetary carriers used in differentials and various covers used in a vehicle powertrain.

Ultra-high strength steel lacks formability using the conventional cold-forming technologies discussed above. Use of conventional cold-forming technologies with ultra-high strength steel typically does not result in the formation of required geometric dimensions and tolerances. However, there is a desire by manufacturers and suppliers to utilize ultra-high strength steel in forming automotive components such as power transmission components for similar reasons as those discussed above when used in static applications of automotive structures (e.g. reduced component weight and improved absorption of impact energy).

As such, a need exists for torque transmitting components, such as clutch housings and hubs, to be formed from ultra-high strength steel, such as boron steel. Additionally, there is a need for an improved method for forming the same. For these reasons, traditional methods for forming torque transmitting features, such as splines, must be developed to work with a Heat-Assisted Calibration (HAC) process so as to allow effective and complete forming of the features for proper interaction with mating components.

SUMMARY

This section provides a general summary of the inventive concepts associated with the present disclosure and is not intended to represent a comprehensive disclosure of its full scope or all of its features, object, aspects, and advantages. Components formed with ultra-high strength steel and a method of forming these components from ultra-high strength steel is provided.

In accordance with an aspect of present disclosure, a method for forming a component utilizing ultra-high strength steel includes the steps of providing a flat blank of ultra-high strength steel. The method proceeds by forming the flat blank into an unfinished shape of a component. Next, the method includes the steps of providing an atmosphere, preferably an inert atmosphere, and heating the unfinished shape of the component in the inert atmosphere. Then, forming a finished shape of the component using a quenching die.

In accordance with an aspect of present disclosure, a component of ultra-high strength steel is produced by providing a flat blank of ultra-high strength steel. Next, forming the flat blank into an unfinished shape of the component. This is followed by heating the unfinished shape of the component. Alternatively, the prior forming step may be followed by providing an inert atmosphere and heating the unfinished shape of the component in the inert atmosphere. Then, forming a finished shape of the component using a quenching die so as to obtain the component.

In accordance with an exemplary embodiment of a component constructed in accordance with the present disclosure, there is provided a clutch housing. The clutch housing has a cylindrical or cup-shaped body and an open end.

In accordance with this exemplary embodiment of the present disclosure, a method for forming the clutch housing from ultra-high strength steel includes cold-forming the body of the clutch housing, heat treating in an inert atmosphere, and quenching using a water-cooled quenching die to form and finalize the cylindrical or cup-shaped body. The ultra-high strength steel forming the body of the clutch housing may be boron steel.

In accordance with this exemplary embodiment of the present disclosure, the method for forming components from ultra-high strength steel includes pre-forming or cold-forming a flat blank of steel into a predetermined shape. The predetermined shape may be a cylindrical or cup-shaped body. The step of cold-forming the flat blank of steel may include forming a plurality of spline teeth along the blank of steel. The method may also include heat treating the blank of steel in an inert atmosphere. The inert atmosphere may be an induction oven or an induction chamber. Additionally, heat treating may be partially or completely localized. The method further includes quenching the heat treated blank of steel. Quenching may include forming a plurality of spline teeth along the blank of steel or finalizing the predetermined form using a water-cooled quenching die.

In accordance with this exemplary embodiment of the present disclosure, the method for forming components from ultra-high strength steel includes heat treating a blank of steel in an inert atmosphere and quenching the heat treated blank into a predetermined shape.

In accordance with another embodiment of a component constructed in accordance with the present disclosure, there is provided a clutch hub. The clutch hub has a cup-shaped body and an open end.

In accordance with yet another embodiment of a component constructed in accordance with the present disclosure, there is provided a planetary carrier. The planetary carrier comprises a first piece and a second piece joined together by a weld. The first piece includes a plurality of legs extending longitudinally. A plurality of apertures is circumferentially disposed in a spaced relationship to each other about the perimeter of each piece.

In accordance with a further embodiment of a component constructed in accordance with the present disclosure, there is provided a reaction shell. The reaction shell comprises a body including a cylindrical first portion of a first diameter and a cylindrical second portion of a second diameter being larger than the first diameter. A plurality of radially outwardly extending spline teeth is disposed about the cylindrical second portion.

In accordance with an aspect of the disclosure, methods of forming features of a component are also provided.

The aspects disclosed herein provide various advantages. For example, the components are more lightweight as a result of a reduced cross section resulting from increased material strength than conventional components using HSLA steel. The components have increased tolerance from using ultra-high strength steel than conventional components. The method is more cost efficient and reduces cost due to component trimming using water-cooled quenching unlike the conventional methods which require additional trimming such as laser trimming. In other words, there is a reduced die wear and maintenance based on the resulting lower cutting forces from using water-cooled quenching. Additionally, there is an improved component reliability due to the reduction of crack initiations due to soft component trimming and an increased manufacturing flexibility using localized induction heating.

It is another aspect of the present disclosure to provide a spline forming process utilized in association with torque transmitting components made from ultra-high strength steel and Heat-Assisted Calibration (HAC) processing.

To overcome deficiencies known in the art, the spline forming methods of the present disclosure are configured to use tools moveable with respect to one or more of the OD and ID of the torque transmitting components. The solution is focused on movement of the tool segments to form spline teeth and/or other complex geometries on the component. All such splines and features are formed simultaneously using tool segments located to completely surround and encircle the component. These components can be "die formed" from round or rectangular blanks or pre-machined forgings. Additionally, flat or formed blanks prior to HAC processing can also be used.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 4 is a flowchart of a method for forming a power transmission component utilizing ultra-high strength steel in accordance with the exemplary embodiment of the present disclosure;

FIG. 5 is a flowchart of a method for forming a power transmission component utilizing ultra-high strength steel in accordance with the exemplary embodiment of the present disclosure;

FIG. 6 is a flowchart of a method for forming a power transmission component utilizing ultra-high strength steel in accordance with the exemplary embodiment of the present disclosure;

FIG. 7 is a flowchart of a method for forming a power transmission component utilizing ultra-high strength steel in accordance with the exemplary embodiment of the present disclosure;

FIG. 8 is a perspective view of a clutch hub in accordance with a second embodiment of the present disclosure;

FIG. 9 is a perspective view of a continuously variable transmission (CVT) plunger in accordance with a third embodiment of the present disclosure;

FIG. 10 is a perspective view of a CVT cylinder in accordance with a fourth embodiment of the present disclosure;

FIG. 25A is a partial cross-sectional view of a clutch housing constructed in accordance with the disclosure;

FIG. 25B is an enlarged partial cross-sectional view of the clutch housing of FIG. 25A and illustrating a clutch apply lever;

FIG. 25C is a perspective view of the clutch housing of FIG. 25A;

FIG. 25D is a partial cross-sectional view along II-II of FIG. 25A and illustrating a plurality of clutch plates, clutch apply lever, and clutch ball ramp disposed within the clutch housing;

FIGS. 29A-29D illustrates ID and OD spline forming alternatives for the process shown in FIG. 28;

FIG. 30 illustrates a portion of a torque transmitting component having a spline formed by an ironing process;

FIG. 31 illustrates a portion of a torque transmitting component having a spline formed by a cam die process;

DETAILED DESCRIPTION

Figure 1:
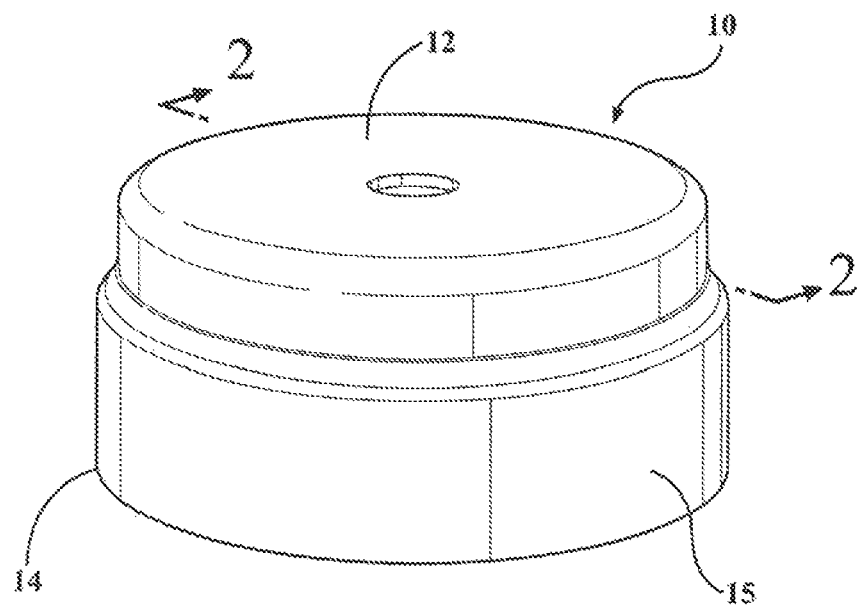
FIG. 1 is a perspective view of a clutch housing and a clutch hub in accordance with an exemplary embodiment of the present disclosure.

Detailed examples of the present disclosure are disclosed herein; however, it is to be understood that the disclosed examples are merely exemplary and may be embodied in various and alternative forms. It is not intended that these examples illustrate and describe all possible forms of the disclosure. Rather, the words used in the specification are words of description rather than limitation, and it is understood that various changes may be made without departing from the spirit and scope of the disclosure.

The aspects disclosed herein include components made of ultra-high strength steel and a method of forming components utilizing ultra-high strength steel. In particular, the components may be for example, lightweight automatic clutch hubs and housings, planetary gear carriers, or torque convertor covers made of boron steel and cold formed in their unhardened state to near net-shape via an "indirect method" and finished sized i.e. net-shaped via Heat-Assisted Calibration (HAC) to achieve 40 to 60% mass reduction of rotating inertia. According to an aspect, the lightweight pre-formed boron steel components (with or without a plurality of spline teeth) are subsequently heated in an inert atmosphere and rapidly transferred to a water-cooled quenching die to minimize oxidation and resulting in a fine-grained martensitic component material structure. The die quenching tool enables net shape processing within geometric dimensions and tolerance requirements. A related aspect utilizes a spline forming process in combination with the HAC process to form net-shaped high strength spline teeth.

As those of ordinary skill in the art will understand various features of the present disclosure as illustrated and described with reference to any of the Figures may be combined with features illustrated in one or more other Figures to produce examples of the present disclosure that are not explicitly illustrated or described. The combinations of features illustrated provide representative examples for typical applications. However, various combinations and modifications of the features consistent with the teachings of the present disclosure may be desired for particular applications or implementations.

Example embodiments of components formed from ultra-high strength steel constructed in accordance with the present disclosure will now be more fully described. These example embodiments are primarily directed to powertrain components. Moreover, each of the exemplary embodiments is provided so that this disclosure is thorough and fully conveys the scope of the inventive concepts, features, and advantages to those skilled in the art. To this end, numerous specific details are set forth to provide a thorough understanding of each of the embodiments associated with the present disclosure. However, as will be apparent to those skilled in the art, not all specific details described herein need to be employed, the example embodiments may be embodied in many different forms, and that neither should be construed nor interpreted to limit the scope of the disclosure.

Figure 2:
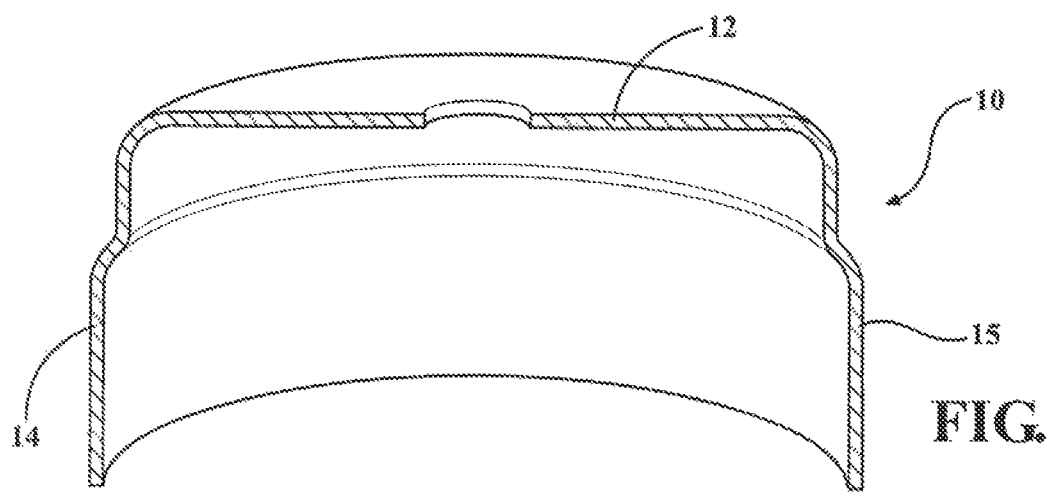
FIG. 2 is a cross-sectional view along 2-2 of FIG. 1.
Figure 3:
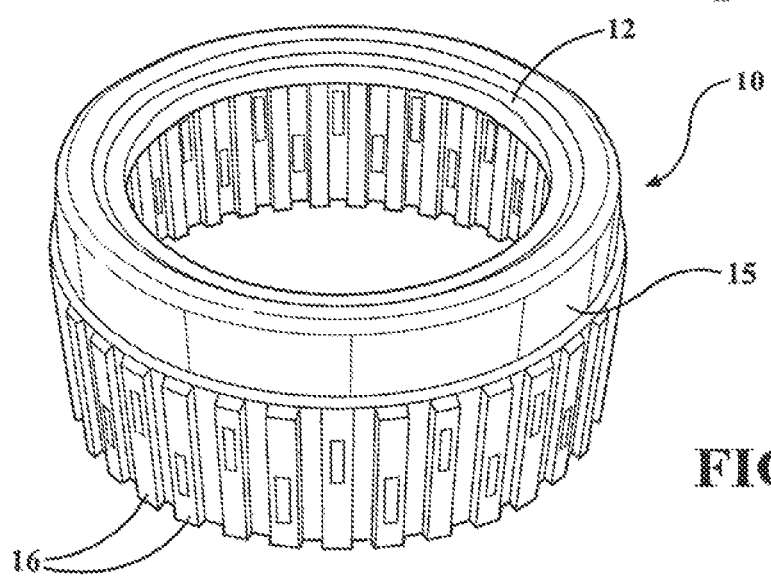
FIG. 3 is a perspective view of a clutch housing having a plurality of spline teeth for engaging a clutch plate in accordance with the exemplary embodiment of the present disclosure.

FIGS. 1-3 show various views of a clutch housing 10 in accordance with an exemplary embodiment of the present disclosure. In particular, FIG. 1 shows a perspective view of a clutch housing 10, FIG. 2 shows a cross-sectional view of the clutch housing 10 and hub 12, and FIG. 3 shows a perspective view of the clutch housing 10 having a plurality of spline teeth 16 disposed thereon. In FIGS. 1 and 2, the clutch housing 10 is shown without the plurality of spline teeth 16. The clutch housing 10 has a generally cylindrical or cup-like shape having a radial ring portion 12 and a cylindrical drum portion 15. Housing 10 is formed from a strip (i.e. blank) of ultra-high strength steel 14, one preferred type of ultra-high strength steel 14 includes 22MnB5 boron steel. The ultra-high strength steel may be pre-coated with aluminum silicon (AlSi) or other material to prevent corrosion and decarburization during the heating and quenching steps. The clutch housing 10 may be a single piece or may be two pieces joined together by a weld or may be pressed-formed. To form the clutch housing 10, a blank of boron steel 14 is preformed, specifically cold-formed, into a pre-determined shape. The predetermined shape may be a cylindrical shape or any shape known in the art related for clutch housings. After the blank of boron steel 14 is cold-formed into a predetermined shape, the predetermined shape is heat treated in an inert environment. The inert environment may be an induction oven or induction chamber. Heat treatment may include, but is not limited to, any or a combination of annealing, case hardening, tempering, quenching, hot forming, or welding. Next, the clutch housing 10 is exposed to a water-cooled quenching tool die to form a plurality of spline teeth 16 thereon, as shown in FIG. 3. Alternatively, the water-cooled quenching die may form a second predetermined shape instead of a plurality of spline teeth 16, as shown in FIGS. 1-2 where the clutch housing 10 is smooth. It is important to note in FIG. 2 that the cross-sectional view shows a reduction in materials used compared to conventional methods using HSLA steel. A clutch hub may be formed in the same manner as will be described further below.

With respect to FIG. 4, a flowchart of a method for forming a component utilizing ultra-high strength steel in accordance with the exemplary embodiment of the present disclosure is provided. As illustrated by additional embodiments described in more detail below, the component may be, but is not limited to, a clutch housing, a clutch hub, a planetary gear carrier, or a torque converter cover. In the exemplary embodiment, the component is the clutch housing 10 described above. First, the method includes the first step 100 of pre-forming a flat blank of steel into a predetermined shape having a plurality of spline teeth 16. Specifically, the pre-forming of the flat blank of steel is carried out by cold-forming techniques. The predetermined or unfinished shape is based on the type of component. For example, if the component is a clutch housing 10, the steel may be cold-formed into a cylindrical or cup-like shape. The flat blank of steel may be 22MnB5 boron steel and may be pre-coated to prevent corrosion. After the flat blank of steel has been pre-formed into a predetermined shape with the plurality of spline teeth 16, the pre-formed predetermined shape is heat treated, second step 102, in an inert atmosphere to alter the properties of the steel. The heat treated steel is then sized and calibrated using a quenching tool, as indicated by step 104. In particular, a water-cooled quenching die is used for the sizing/calibration operation.

With respect to FIG. 5, a flowchart with a method for forming a component utilizing ultra-high strength steel in accordance with the exemplary embodiment of the present disclosure is provided. The method includes step 200 of pre-forming a flat blank of steel into a cup-shaped body. As discussed above, the flat blank of steel may be a 22MnB5 boron steel blank. The cup-shaped body is then, at step 202, heat treated in an inert environment. The inert environment may be an induction chamber or oven. Next, the method includes step 204 for water-cooled quenching of the cup-shape body to form a plurality of spline teeth thereon.

FIGS. 6-7 also show flowcharts of methods for forming a component utilizing ultra-high strength steel in accordance with the exemplary embodiment of the present disclosure. Like the methods shown in FIGS. 4-5, the methods shown in FIGS. 6-7 utilize 22MnB5 boron steel. However, it is appreciated by one skilled in the art that any type of ultra-high strength steel or any type of boron steel may be used in conjunction with these methods. In FIG. 6, the method includes step 300 for pre-forming or cold-forming the flat blank of steel into a predetermined shape. The predetermined or unfinished shape of the method shown in FIG. 6 does not include a plurality of spline teeth 16. The cold-formed steel is then, at step 302, heat treated in an inert atmosphere. The heat treatment may be localized to a certain portion of the steel. The method further includes step 304 for forming a plurality of spline teeth 16 within the heat treated steel using a quenching tool. The quenching tool is a water-cooled quenching die.

With respect to FIG. 7, the method for forming a component utilizing ultra-high strength steel in accordance with the exemplary embodiment of the present disclosure includes step 400 for heat treating a flat blank of steel in an inert atmosphere and step 402 quenching the heat treated flat blank into a predetermined shape using a quenching tool.

The method discussed above may also include, but is not limited to cold-forming the clutch housing 10 without a plurality of spline teeth 16, heat treating the unfinished shape of the clutch housing 10 using localized induction heating, and forming and sizing the plurality of spline teeth 16 using the quenching die. Alternatively, the method may include pre-forming/cold-forming the clutch housing 10 with a plurality of spline teeth 16, heating the unfinished shape of the clutch housing 10 in an inert environment, and sizing and finalizing the shape of the housing 10 in the quenching die. Similarly, planetary gear carriers and other components may be partially or completely cold formed and then heated using either localized or entire part heating.

In addition to the clutch housing 10 disclosed above, other embodiments of components from ultra-high strength steel constructed in accordance with the present disclosure are described in more detail below. FIG. 8 shows a clutch hub 500 in accordance with a second embodiment of the present disclosure. The clutch hub 500 has a cup-like shape having a radial ring portion 502 and a cylindrical drum portion 504. A tubular neck 506 extends longitudinally from the radial ring portion 502 and a drive gear 508 is attached to the tubular neck 506. Like the clutch housing 10, the clutch hub 500 may be formed from a strip (i.e. blank) of ultra-high strength steel. The ultra-high strength steel may also be pre-coated with aluminum silicon (AlSi) or other material to prevent corrosion and decarburization during the heating and quenching steps. The clutch hub 500 may be a single piece or may be two pieces joined together by a weld or may be press-formed. To form the clutch hub 500, a blank of boron steel can be cold-formed into a predetermined or unfinished shape. A plurality of generally triangular openings 510 can be formed in the radial ring portion during cold forming for weight reduction. The predetermined shape may then be heat treated in an inert environment. Next, the clutch hub 500 may be exposed to a water-cooled quenching tool die to form a plurality of radially outwardly extending spline teeth 512 disposed about the cylindrical drum portion 504.

FIG. 9 shows a continuously variable transmission (CVT) plunger 520 in accordance with a third embodiment of the present disclosure. The CVT plunger 520 includes a generally bell-shaped body defining a centrally disposed opening 522. The CVT plunger 520 is formed from a preformed flat blank of ultra-high strength steel, preferably 22MnB5 boron steel. The blank of boron steel may be cold-formed into a predetermined or unfinished shape with a thick center and outer edge. The predetermined shape can then be heat treated in an inert environment. Next, the CVT plunger 520 can be exposed to a water-cooled quenching tool die.

FIG. 10 shows a CVT cylinder 540 in accordance with a fourth embodiment of the present disclosure. The CVT cylinder 540 includes an annular or cylindrically shaped body having a first end 542 and a second end 544 and including a shoulder 546 formed at the first end 542. The body of the CVT cylinder 540 defines an opening 548 longitudinally extending from the first end 542 to the second end 544. The CVT cylinder 540 begins as a preformed flat blank of ultra-high strength steel, preferably 22MnB5 boron steel, with the centrally disposed material removed and discarded. Next, the preformed blank or unfinished shape is heat treated in an inert environment. Then, the CVT cylinder 540 is exposed to a water-cooled quenching tool die.

Figure 11:
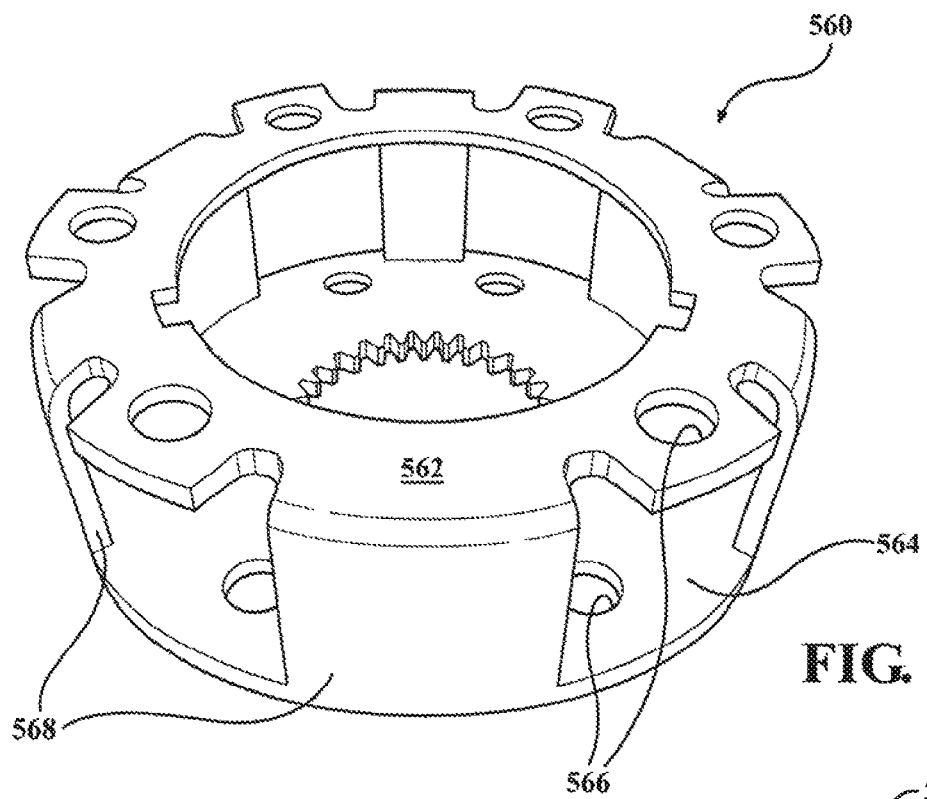
FIG. 11 is a perspective view of a planetary carrier in accordance with a fifth embodiment of the present disclosure.

FIG. 11 shows a planetary carrier 560 in accordance with a fifth embodiment of the present disclosure. The planetary carrier 560 comprises a first piece 562 and a second piece 564 joined together by a weld. A plurality of apertures 566 are circumferentially disposed in a spaced relationship to each other about the perimeter of each piece 562, 564. The first piece 562 includes a plurality of legs 568 extending longitudinally. To form the first piece 562 of the planetary carrier 560, a flat blank of boron steel can be cold-formed into a predetermined or unfinished shape with the plurality of apertures 566 and including the legs 568. To form the second piece 564 of the planetary carrier 560, a flat blank of boron steel can be cold-formed into an unfinished shape with the plurality of apertures 566. The unfinished shapes of the pieces 562, 564 are heat treated in an inert environment. Next, each piece 562, 564 of the carrier 560 may be exposed to a water-cooled quenching tool die. The planetary carrier 560 is completed by joining or welding the legs 568 of the first piece 562 to the second piece 564.

Figures 12A, 12B:
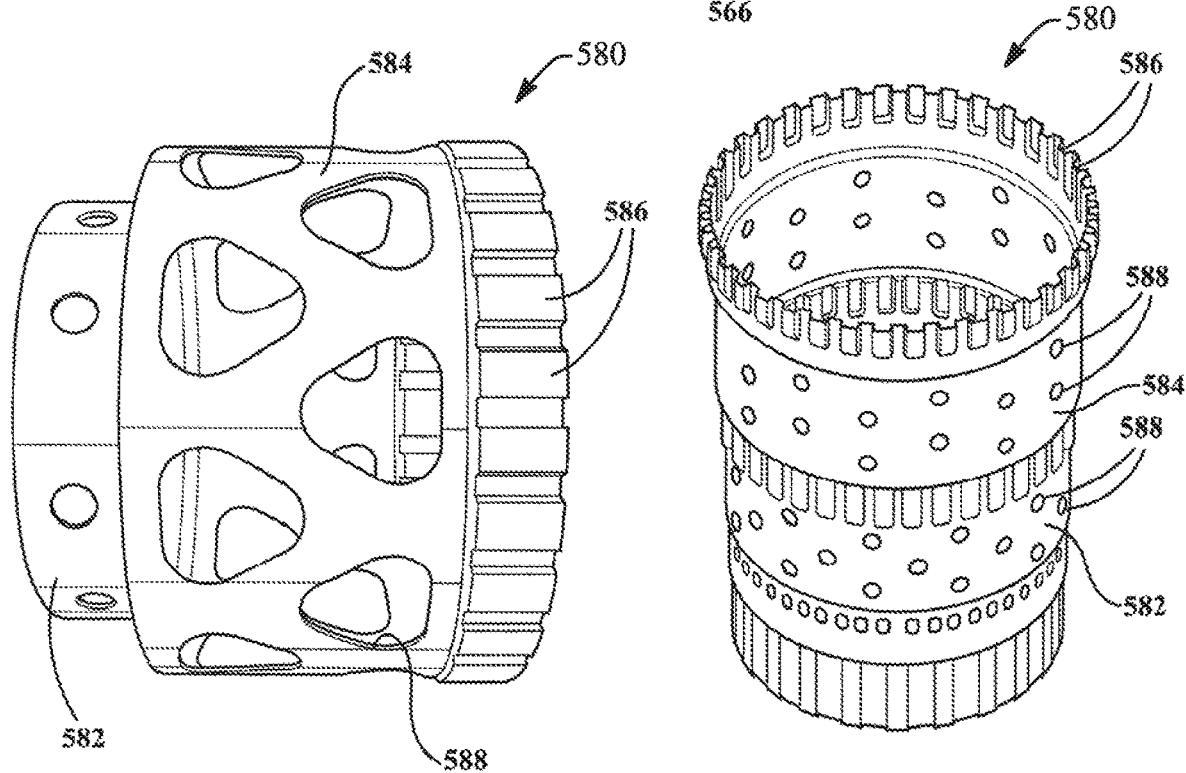
FIG. 12A is a side view of a reaction shell in accordance with a sixth embodiment of the present disclosure.
FIG. 12B is a perspective view of a reaction shell in accordance with the sixth embodiment of the present disclosure.

FIGS. 12A and 12B show two reaction shells 580 in accordance with a sixth embodiment of the present disclosure. Each reaction shell 580 comprises a body including a cylindrical first portion 582 of a first diameter and a cylindrical second portion 584 of a second diameter being larger than the first diameter. A plurality of radially outwardly extending spline teeth 586 is disposed about the cylindrical second portion 584. A plurality of bores 588 are defined by the cylindrical first portion 582 and the cylindrical second portion 584. To form the reaction shell 580, a flat blank of boron steel is cold-formed into a predetermined tubular shape or unfinished shape having the bores. The predetermined tubular shape is then heat treated in an inert environment. Although the bores 588 are formed while cold-forming, it should be understood that the bores 588 may also be formed while the predetermined tubular shape is hot. Next, the reaction shell is exposed to a water-cooled quenching tool die to hold the geometry and form the radially outwardly extending spline teeth 586 disposed about cylindrical second portion 584. As will be detailed, spline teeth 586 can be formed prior to quenching of the die tool.

Figure 13:
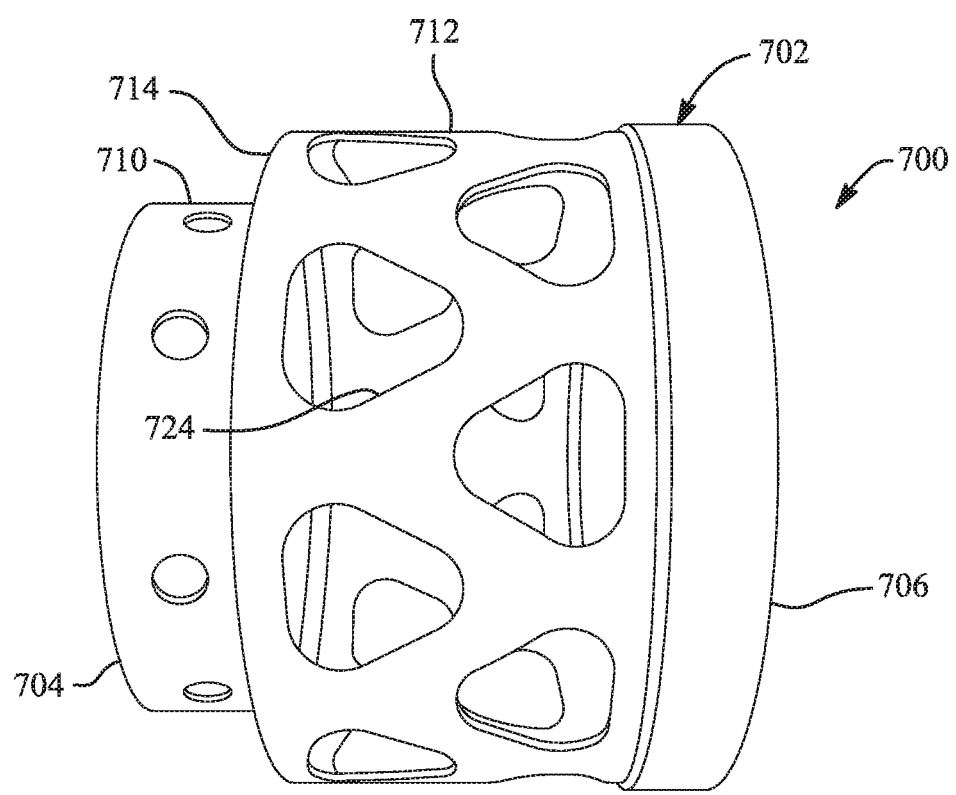
FIG. 13 is a side view of a first reaction shell constructed in accordance with the disclosure.
Figure 14A:
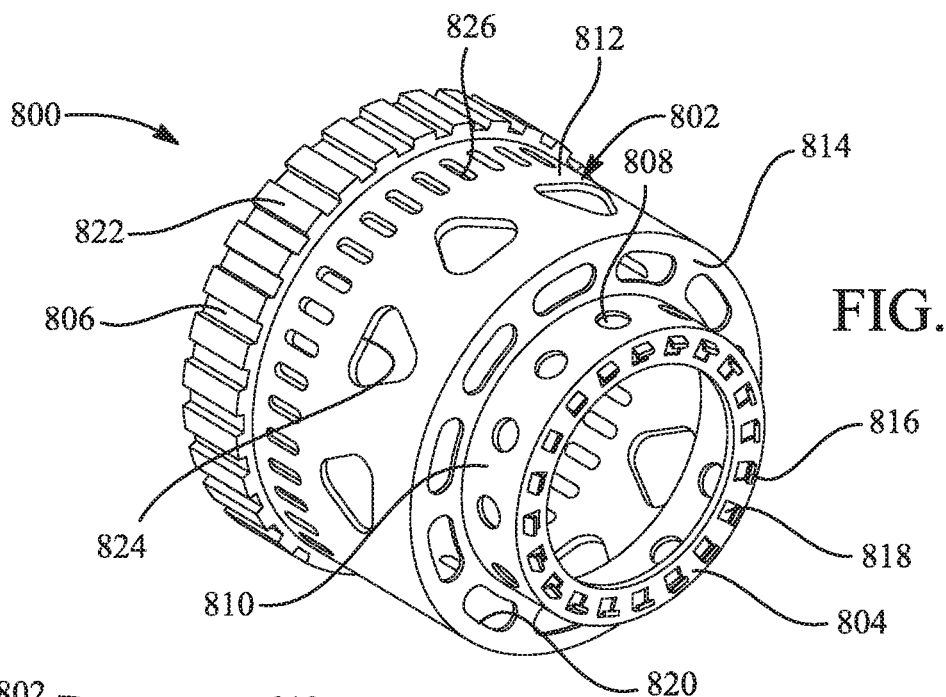
FIG. 14A is a perspective view of a second reaction shell constructed in accordance with the disclosure.
Figure 14B:
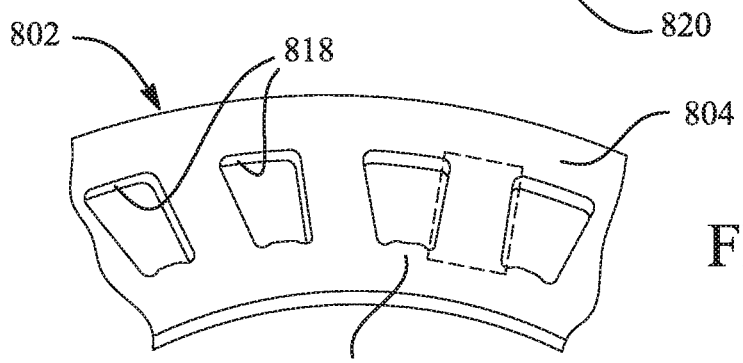
FIG. 14B is an enlarged partial view of the second reaction shell of FIG. 14A.
Figure 14C:
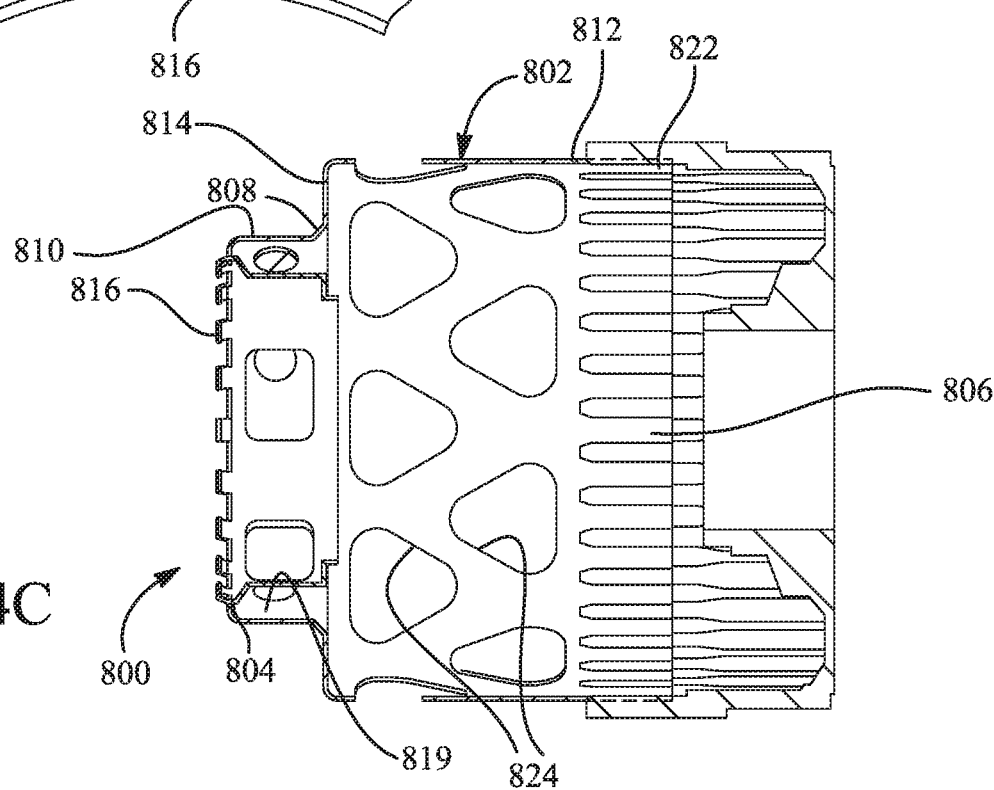
FIG. 14C is cross-sectional view of the second reaction shell of FIG. 2A.
Figure 15A:
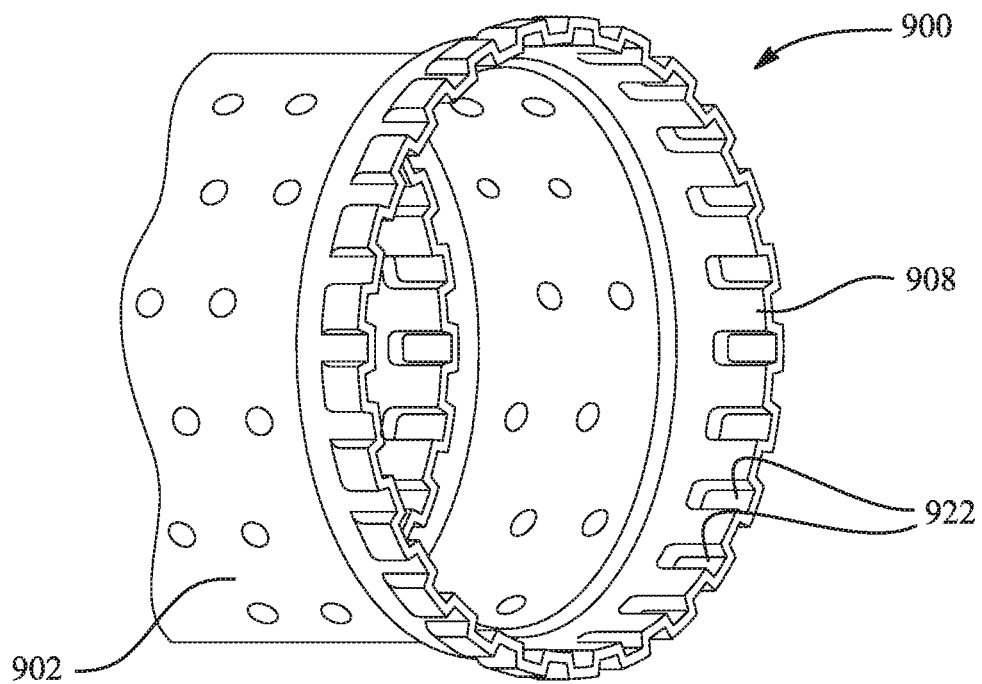
FIG. 15A is a partial perspective view of a third reaction shell constructed in accordance with the disclosure.
Figure 15B:
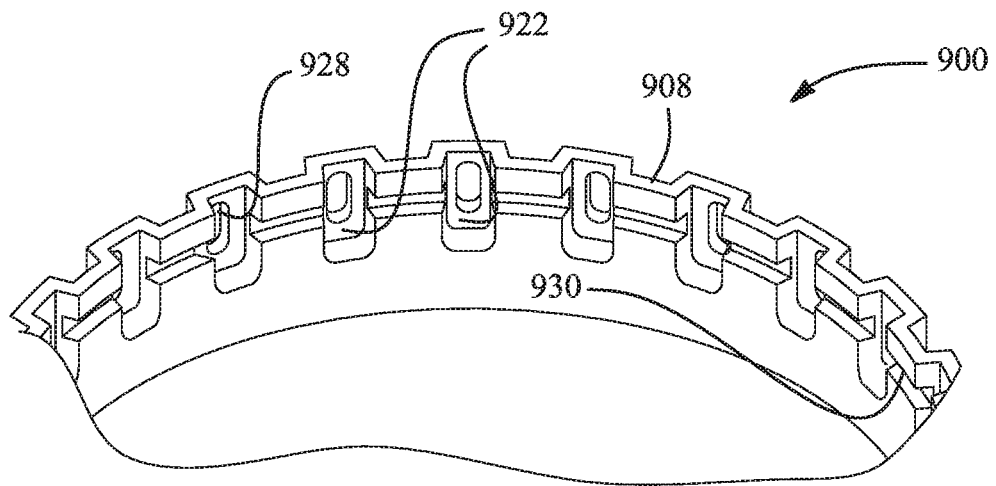
FIG. 15B is an enlarged partial view of the third reaction shell of FIG. 15A.
Figure 16A:
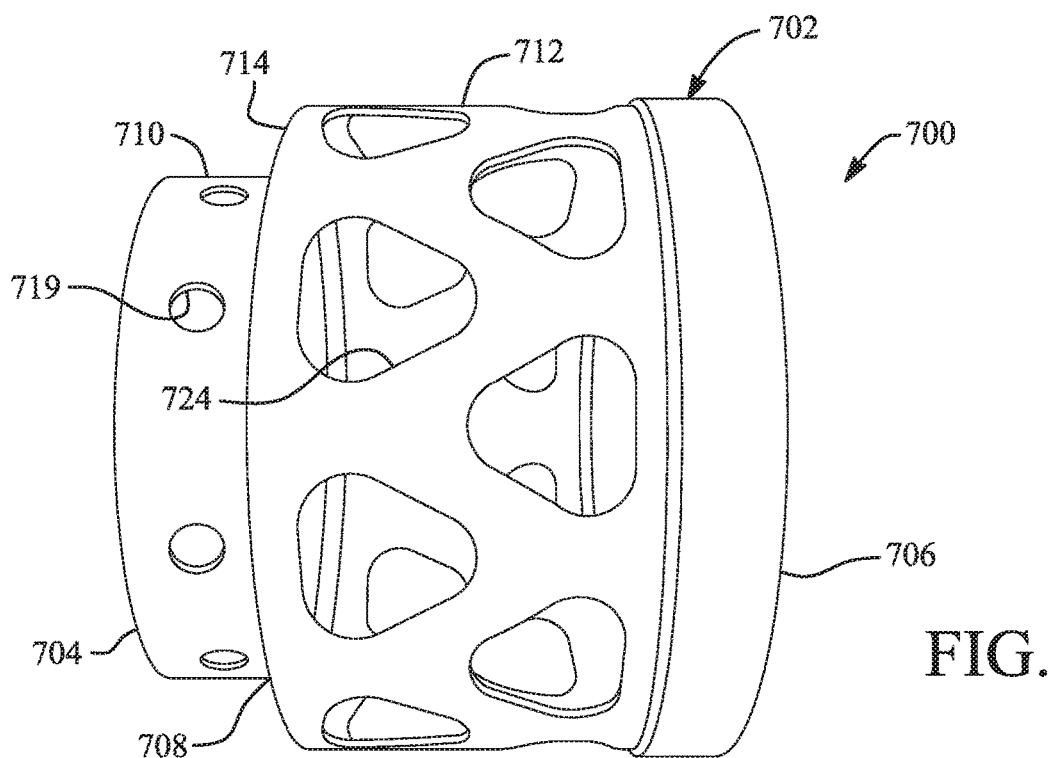
FIG. 16A is a is a side view of the first reaction shell of FIG. 1.
Figure 16B:
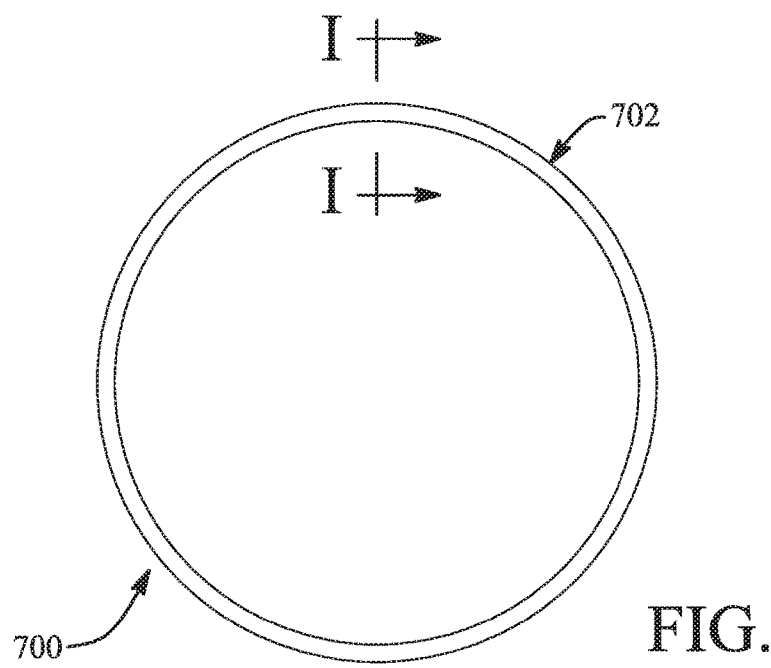
FIG. 16B is a cross-sectional view of the first reaction shell of FIG. 1.

FIGS. 13, 14A-14C, 15A-15B, and 16A-16B show various views of reaction shells 700, 800, 900 constructed in accordance with exemplary embodiments of the present disclosure similar to those shown in FIGS. 12A and 12B. Such reaction shells 700, 800, 900 could, for example, be used as part of a planetary gear assembly in a transmission. In particular, FIG. 13 shows a side view of a first reaction shell 700, FIG. 14A shows a perspective view of a second reaction shell 800, FIG. 14B is an enlarged view of a portion of the second reaction shell 800 and FIG. 14C shows a cross-sectional view of the second reaction shell 800. FIG. 15A is a partial perspective view of a third reaction shell 900 and FIG. 15B is an enlarged view of a portion of the third reaction shell 900. FIG. 16A shows the first reaction shell 700 also shown in FIG. 13 and FIG. 16B shows a cross-sectional view of the first reaction shell 700. Each reaction shell 700, 800, 900 comprises a body 702, 802, 902 having a proximal end 704, 804, 904 and a distal end 706, 806, 906 and may include a shoulder 708, 808 defined therebetween. Similar to the reaction shells 580 described with reference to FIGS. 12A and 12B above, the body 702, 802, 902 may also include a cylindrical first portion 710, 810 of a first diameter extending from the proximal end 704, 804 to the shoulder 708, 808 and a cylindrical second portion 712, 812 of a second diameter that is larger than the first diameter and extending from the shoulder 708, 808 to the distal end 706, 806.

Referring now to the first reaction shell 700 and the second reaction shell 800, the shoulder 708, 808 of the body 702, 802 defines a first flange 714, 814 extending radially outwardly from the first portion 710, 810 to the second diameter of the second portion 712, 812. The first portion 810 of the body 802 may include a radially inwardly extending second flange 816 at the proximal end 804 (FIG. 14A). The second flange 816 may also define a plurality of slots 818 or castle joint windows spaced circumferentially about the second flange 816 for engaging a carrier (FIG. 14C). A plurality of first bores 719, 819 are defined by and disposed circumferentially about the first portion 710, 810 for mass reduction and/or balancing. Similarly, the first flange 814 may also define a plurality of elongate shoulder bores 820 disposed circumferentially.

As best shown in FIGS. 14A and 14C, the second portion 812 of the body 802 of the second reaction shell 800 defines a plurality of radially outwardly extending spline teeth 822 disposed thereabout adjacent the distal end 806. The spline teeth 822 are intended to engage a transfer component of a transmission (FIG. 14C). A plurality of triangular bores 724, 824 may also defined by and disposed circumferentially about the second portion 712, 812. Similarly, the second portion 712, 812 of the body 702, 802 may also define speed sensor bores 826 (FIG. 14A) disposed circumferentially for use in conjunction with an optical or Hall Effect speed sensor, for example.

As best shown FIG. 15A, the body 902 of the third reaction shell 900 also defines a plurality of radially outwardly extending spline teeth 922 disposed thereabout adjacent the distal end 908. Additionally, the third reaction shell 900 defines a plurality of spline bores 928 (FIG. 15B) which are disposed circumferentially about the body 902 and extending radially through a selection of the spline teeth 922. A snap ring groove 930 is defined by an inner surface of the spline teeth 922 (FIG. 15B).

To form each of the reaction shells 700, 800, 900 or other components, a plurality of "heat assisted calibration" (HAC) method steps may be employed as described earlier. The methods illustrated in FIGS. 17A-24E and described in detail below include more specific method steps for forming specific features (e.g. bores, tabs, etc.) of a component, such as, but not limited to the reaction shells 700, 800, 900.

Referring back to FIGS. 14A and 14B, areas of the second flange 816 of the body 802 of the second reaction shell 800 in between the slots 818 may be "thickened." As discussed in more detail below, the material forming the reaction shell 800 may be pierced in the center of the slot 818 and moved or molded from the slots 818 or openings to locally thicken the reaction shell 800 to allow engagement to a mating component (e.g. carrier) with reduced stress.

Figure 17A:
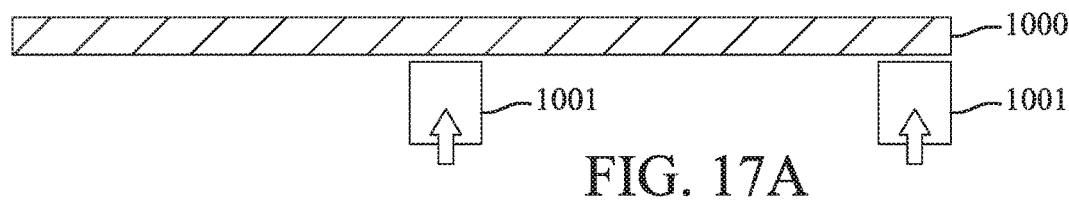
FIGS. 17A-17F shows a method of forming a component in accordance with the disclosure and illustrated with cross-sectional views of the first reaction shell along I-I of FIG. 16B.
Figure 17B:
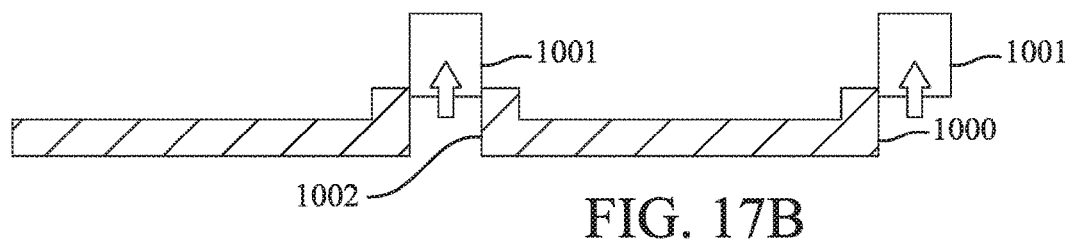
Figure 17C:
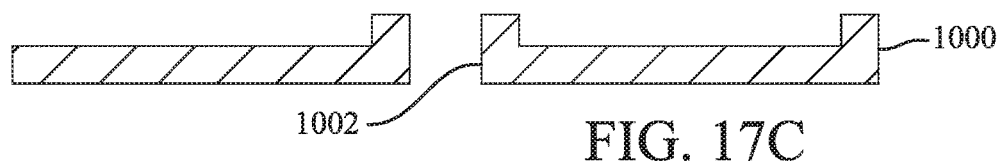
Figure 17D:
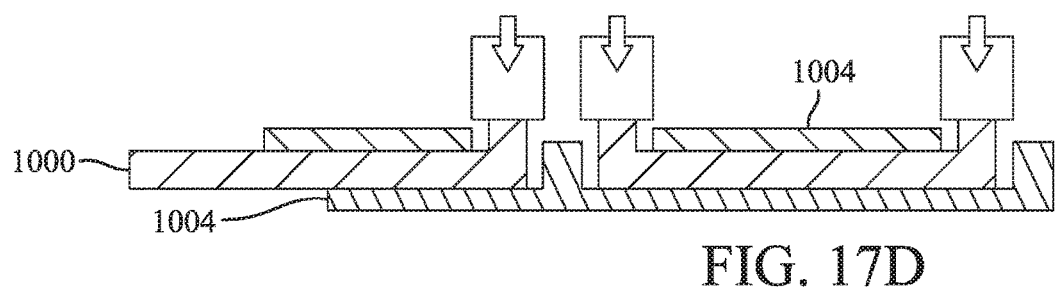
Figure 17E:
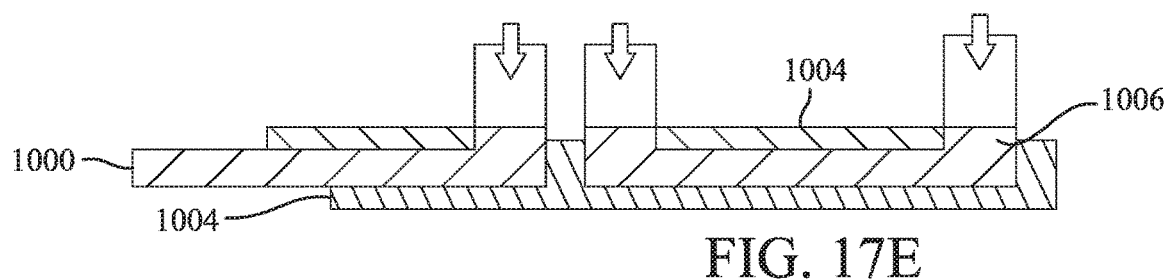
Figure 17F:
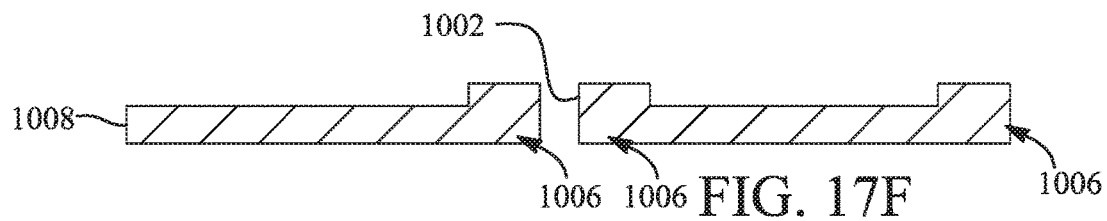

As best shown in FIGS. 17A-17F, a method of forming a component (e.g. reaction shell 700, 800, 900) may include a series of thickening steps. Such a method may be used to form a section of material "up" as in an extrusion of a bore or multiple bores, or around the outer perimeter of a round blank while still in its "green" state. FIGS. 17A-17F show, for example, a cross-section of the first reaction shell 700 shown in FIG. 16B. The method begins with cold-forming a flat blank of boron steel into a predetermined tubular shape, blank, or unfinished shape 1000 as best shown in FIG. 17A. Next, punching the unfinished shape 1000 with a punch 1001 to form holes 1002 (FIG. 17B). The punching occurs while the part 1000 is still "green" to produce "formed up" material. As shown in FIG. 17C, the method proceeds with heat treating the predetermined tubular shape 1000 (e.g. in an inert environment). The next steps of the method are transferring the predetermined tubular shape 1000 to quench and calibration tooling 1004 and compressing the predetermined tubular shape (i.e. the "formed up" material) using the tooling 1004 to form the desired geometry and thickness while the predetermined tubular shape 1000 remains hot (FIG. 17D). The desired geometry and thickness may include thickened areas 1006. Specifically, the geometry and thickness are controlled by factors such as, but not limited to, the tooling stops and press stroke. Next, holding the predetermined tubular shape 1000 with compression until cooled with the tooling in place, as shown in FIG. 17E. The final part 1008 is best shown in FIG. 17F and illustrates thickened areas 1006.

Figure 18A:
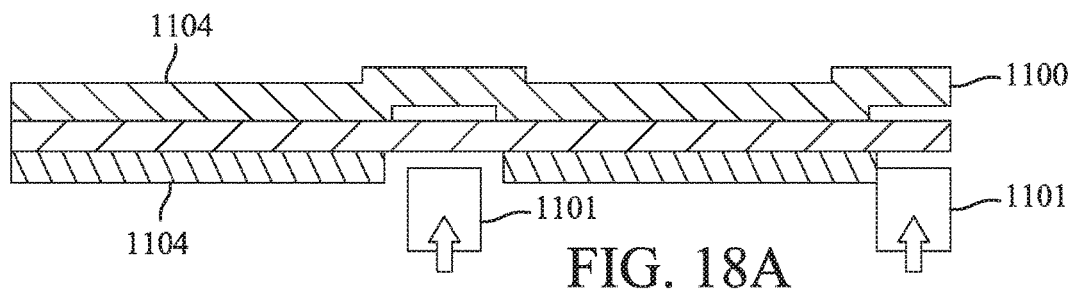
FIGS. 18A-18E shows a method of forming a component in accordance with the disclosure and illustrated with cross-sectional views of the first reaction shell along I-I of FIG. 16B.
Figure 18B:
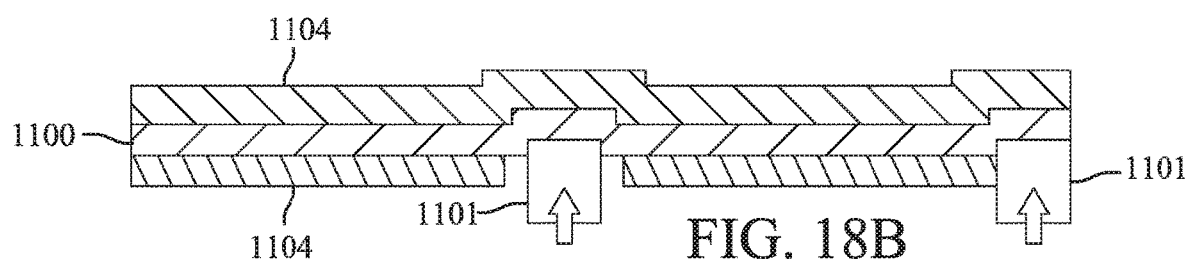
Figure 18C:
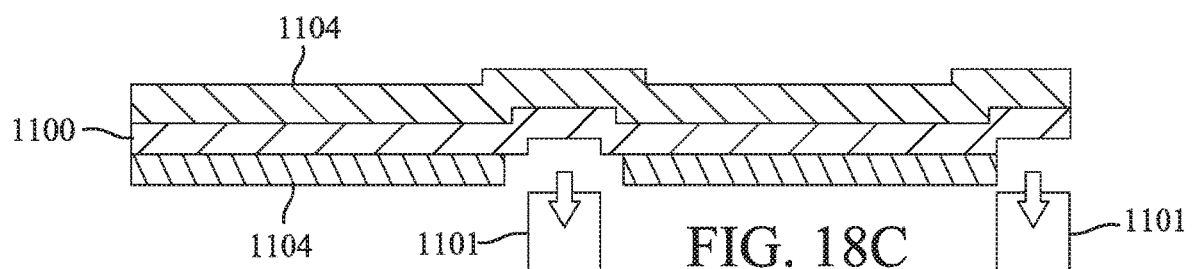
Figure 18D:
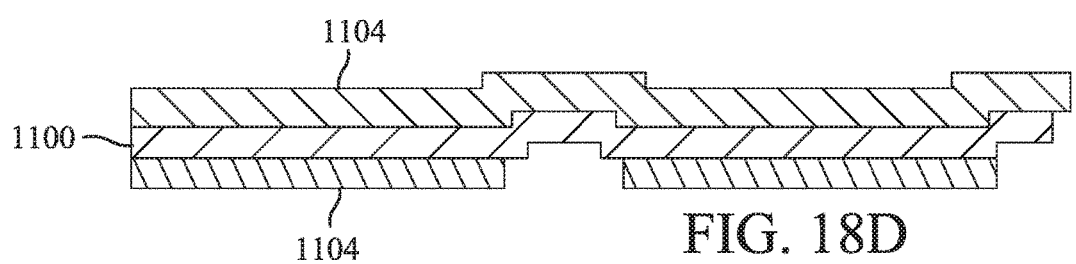
Figure 18E:
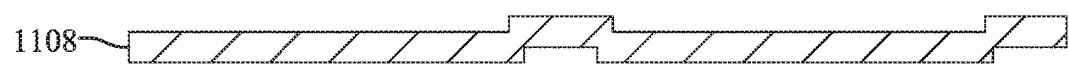

As best shown in FIGS. 18A-18E, a method of forming a component (e.g. reaction shell 700, 800, 900) may include a series of hot forming steps in which the punch 1101 is removed. Such a method may be used, for example, when it is desired to form the ultra-high strength steel to the chosen geometry without shearing (e.g. forming a snap-ring groove or bent tab). FIGS. 18A-18E show, for example, a cross-section of the first reaction shell 700 shown in FIG. 16B. The method begins with heating a blank or unfinished shape 1100 (e.g. predetermined tubular shape) in a forming tool 1104 (FIG. 18A). According to an aspect of the disclosure, the blank 1100 is heated to approximately 900° C. (degrees Celsius). Next, punching the unfinished shape 1100 by pressing partially through the blank 1100 with the punch 1101 (FIG. 18B). The punching occurs while the unfinished shape 1100 is hot. As shown in FIG. 18C, the method proceeds with removing the punches 1101 and retaining the tooling in contact with the blank 1100. The punches 1101 may be removed or retracted before the material 1100 is quenched and the martensitic structure is formed. The next steps of the method are quenching the unfinished shape 1100 with the punches 1101 removed and while the unfinished part is in contact with the tooling 1104 until it cools (FIG. 18D). The final part 1108 is best shown in FIG. 18E.

Figure 19A:
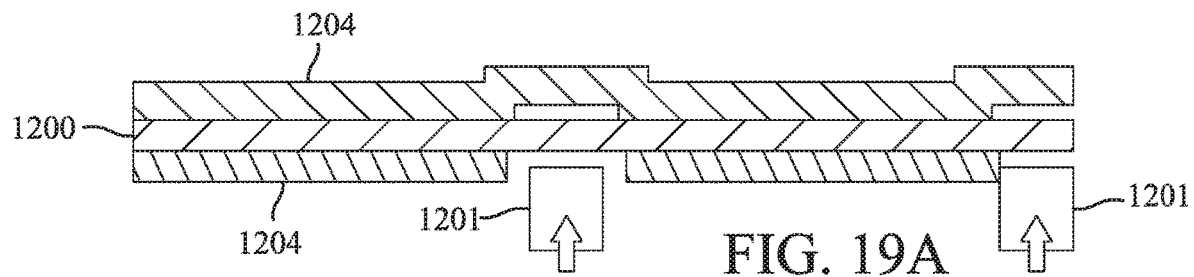
FIGS. 19A-19E shows a method of forming a component in accordance with the disclosure and illustrated with cross-sectional views of the first reaction shell along I-I of FIG. 16B.
Figure 19B:
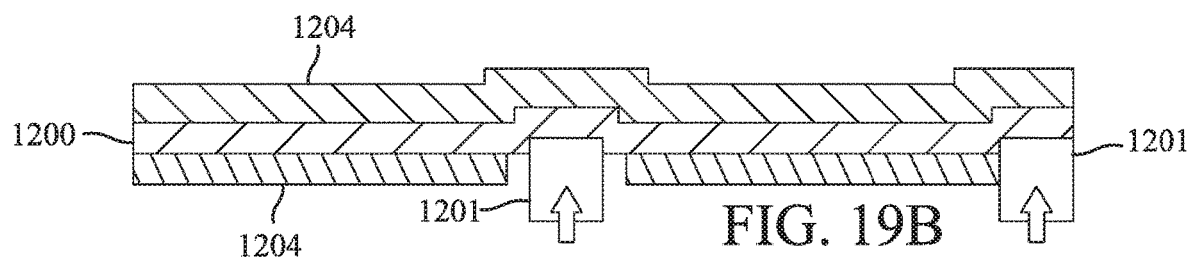
Figure 19C:
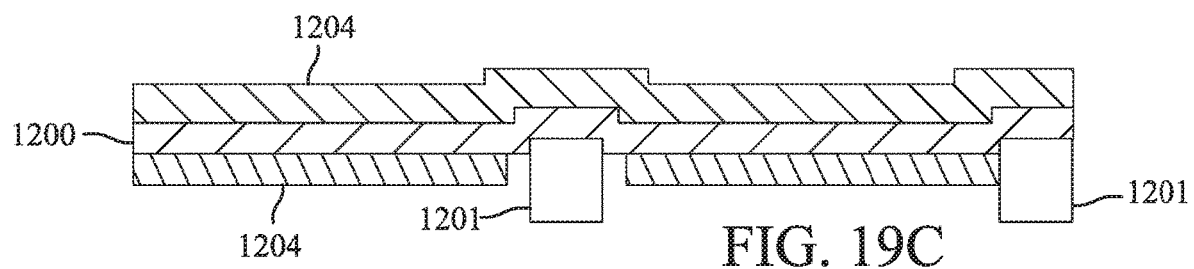
Figure 19D:
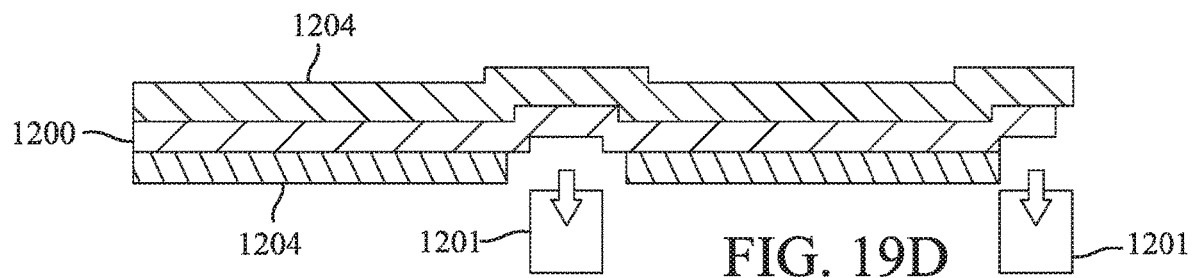
Figure 19E:
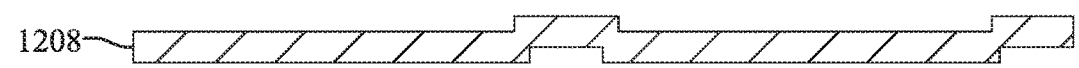

As best shown in FIGS. 19A-19E, a method of forming a component (e.g. reaction shell 700, 800, 900) may include a series of hot forming steps in which the punch 1201 is held in place. Such a method may be used when it is desired to form the ultra-high strength steel to the chosen geometry without shearing (e.g. forming a snap-ring groove). FIGS. 19A-19E show, for example, a cross-section of the first reaction shell 700 shown in FIG. 16B. The method begins with heating a blank 1200 or unfinished shape (e.g. predetermined tubular shape) in a forming tool 1204 (FIG. 19A). According to an aspect of the disclosure, the blank 1200 is heated to approximately 900° C. Next, punching the unfinished shape 1200 by pressing partially through with the punch 1201 (FIG. 19B). The punching occurs while the unfinished shape 1200 is hot. As shown in FIG. 19C, the method proceeds with holding the punches 1201 in place. The method continues by quenching the unfinished shape 1200 and retaining the tooling 1204 in contact with the blank 1200 while the punches 1201 are in contact with the unfinished part 1200. By holding the punches 1201 in place, they may assist with the quenching as long as the geometry allows and no binding will occur. The method concludes with removing the punches 1201 after cooling (FIG. 19D). The final part 1208 is best shown in FIG. 19E.

Figure 20A:
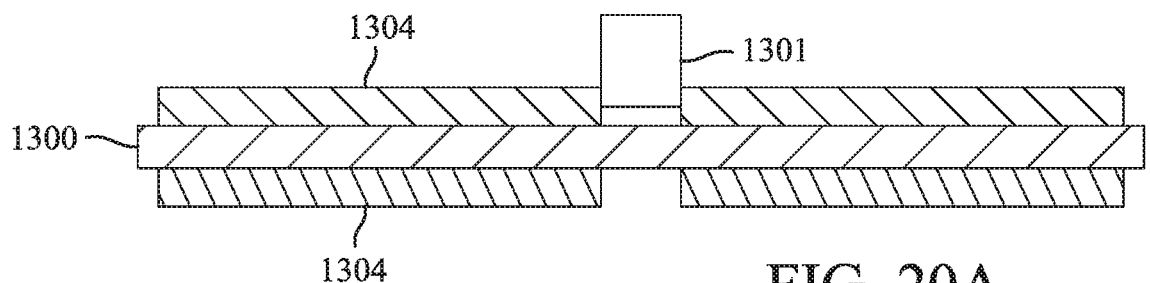
FIGS. 20A-20E shows a method of forming a component in accordance with the disclosure and illustrated with cross-sectional views of the first reaction shell along I-I of FIG. 16B.
Figure 20B:
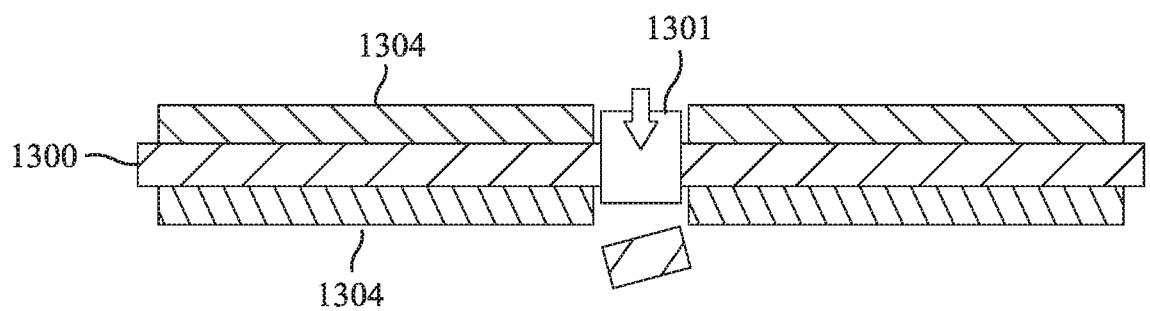
Figure 20C:
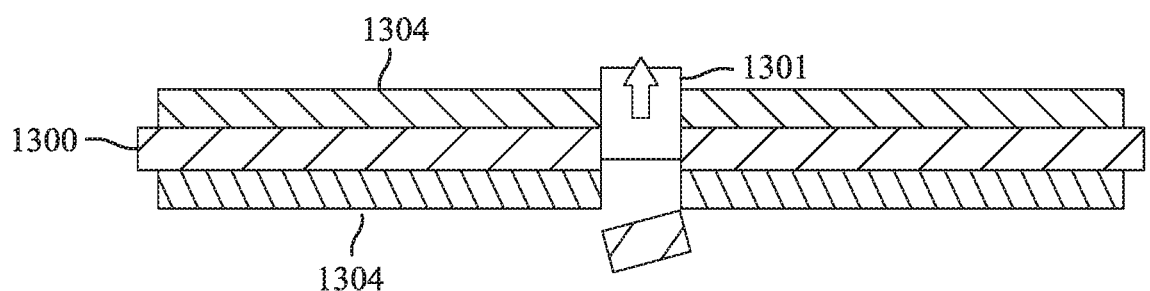
Figure 20D:
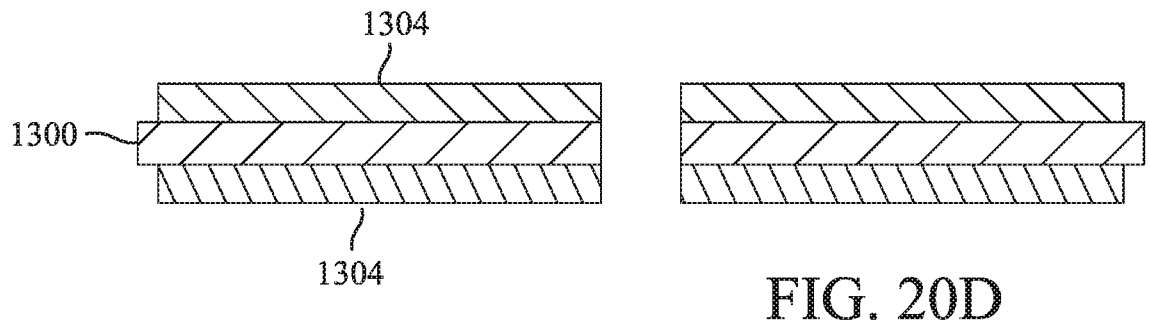
Figure 20E:
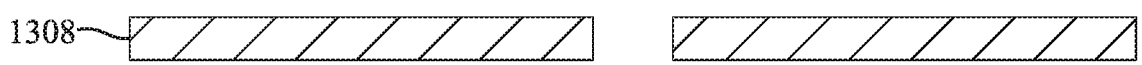

As best shown in FIGS. 20A-20E, a method of forming a component (e.g. reaction shell 700, 800, 900) may include a series of hot piercing steps. Such a method may be used when it is desired to shear the ultra-high strength steel and then retract the punches 1301 before the material 1300 is quenched and the martensitic structure is formed. FIGS. 20A-20E show, for example, a cross-section of the first reaction shell 700 shown in FIG. 16B. The method begins with heating a blank 1300 or unfinished shape (e.g. predetermined tubular shape) in a forming tool 1304. According to an aspect of the disclosure, the blank 1300 is heated to approximately 900° C. Next, extending punches 1301 to sheer the blank 1300 or unfinished shape (FIG. 20B). The punching occurs while the unfinished shape 1300 is hot. As shown in FIG. 20C, the method proceeds with removing the punches 1301. The method continues by quenching the unfinished shape with the punches 1301 removed and retaining the tooling 1304 in contact with the blank 1300 as best shown in FIG. 20D. The final part 1308 is best shown in FIG. 20E.

Figure 21A:
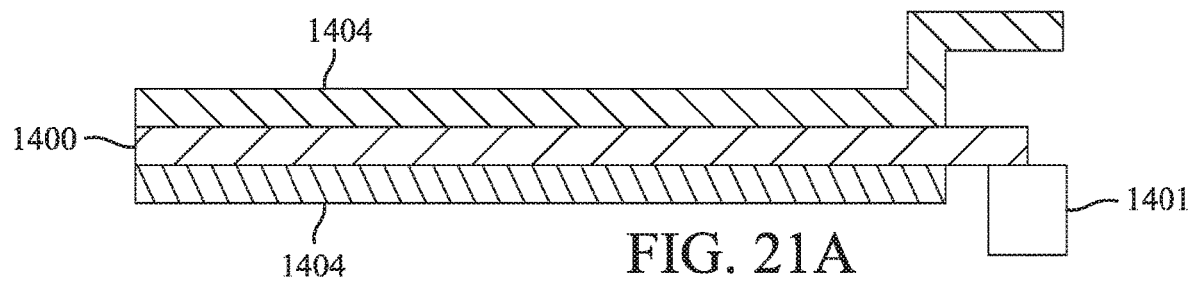
FIGS. 21A-21E shows a method of forming a component in accordance with the disclosure and illustrated with cross-sectional views of the first reaction shell along I-I of FIG. 16B.
Figure 21B:
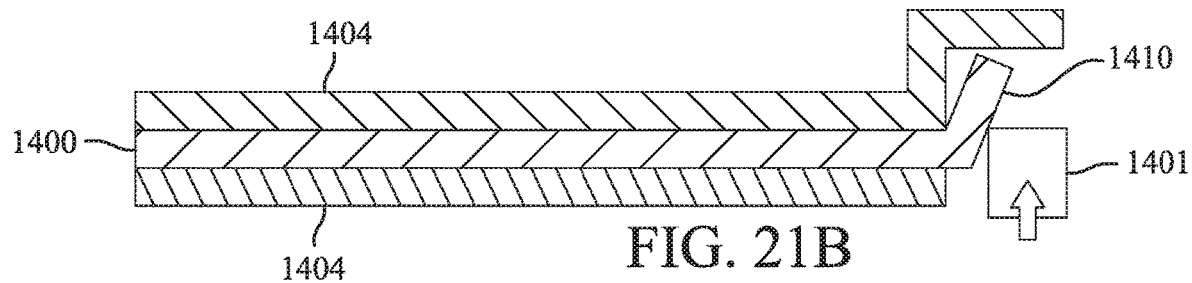
Figure 21C:
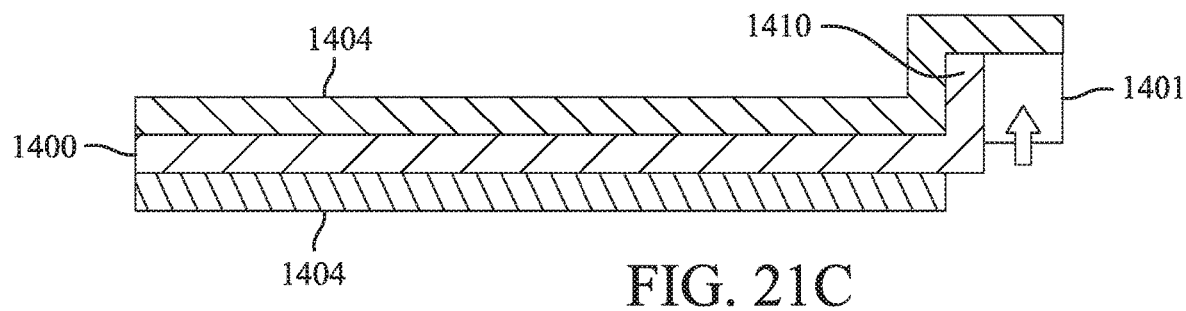
Figure 21D:
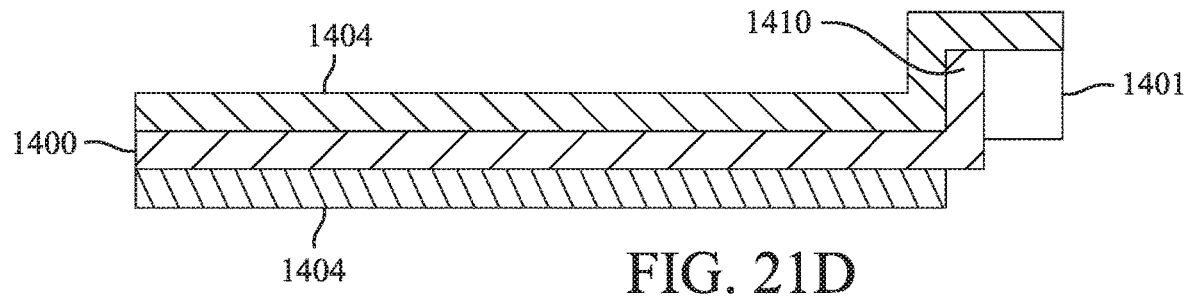
Figure 21E:

As best shown in FIGS. 21A-21E, a method of forming a component (e.g. reaction shell 700, 800, 900) may include a series of hot forming steps in which the punch 1401 is held in place to form a feature such as a tab face 1410. Such a method may be used when it is desired to bend the ultra-high strength steel to the chosen geometry (e.g. forming a tab face 1410). FIGS. 21A-21E show, for example, a cross-section of the first reaction shell shown in FIG. 16B. The method begins with heating a blank 1400 or unfinished shape (e.g. predetermined tubular shape) in a forming tool 1404 (FIG. 21A). According to an aspect of the disclosure, the blank 1400 is heated to approximately 900° C. Next, forming tab face 1410 into unfinished shape by turning an edge into face 1410 by pressing a punch 1401 through (FIG. 21B). The forming occurs while the unfinished shape 1400 is hot. As shown in FIG. 21C, the method proceeds with completing the forming of the tab face 1410 by completely following through of the punch 1401 and holding the punch 1401 in place. The method continues by quenching the unfinished shape 1400 and retaining the tooling 1404 in contact with the blank 1400 while the punches 1401 are in contact with the unfinished part 1400 (FIG. 21D). By holding the punches 1401 in place, they may assist with the quenching as long as the geometry allows and no binding will occur. The method concludes with removing the punches 1401 after cooling. The final part 1408 is best shown in FIG. 21E.

Figure 22A:
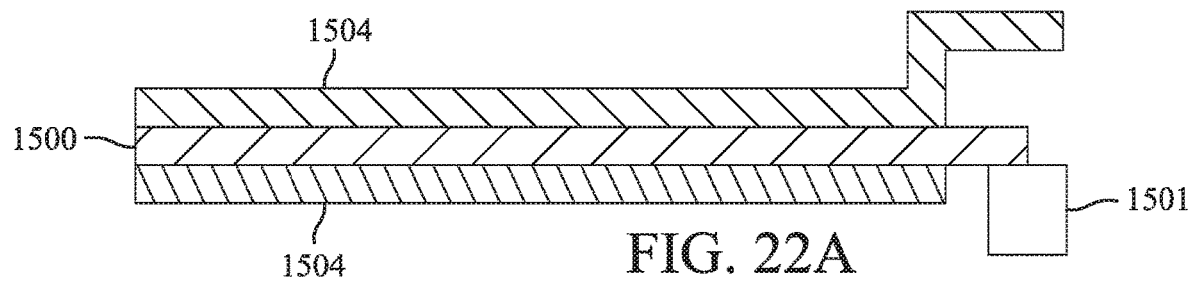
FIGS. 22A-22E shows a method of forming a component in accordance with the disclosure and illustrated with cross-sectional views of the first reaction shell along I-I of FIG. 16B.
Figure 22B:
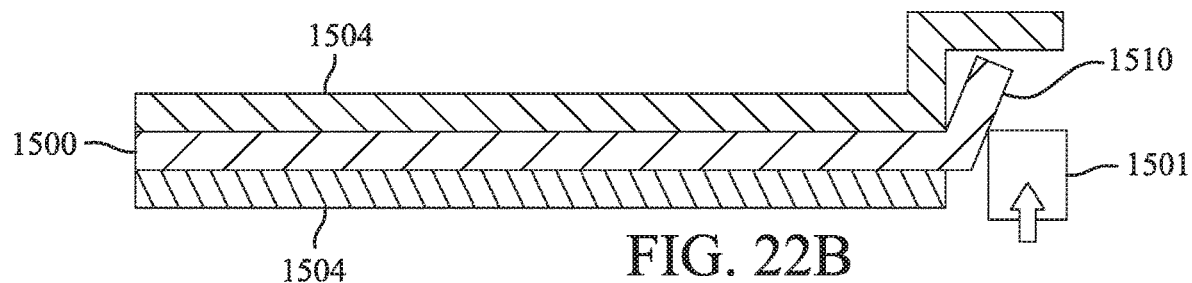
Figure 22C:
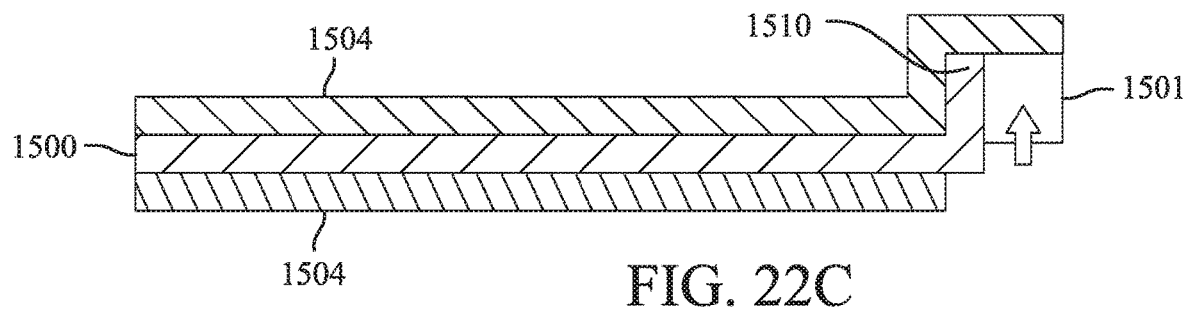
Figure 22D:
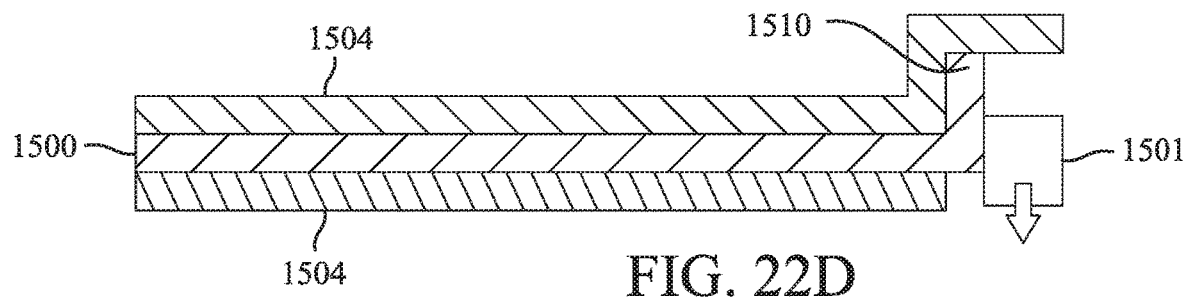
Figure 22E:
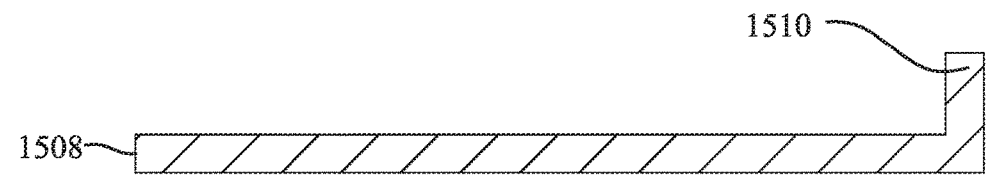

As best shown in FIGS. 22A-22E, a method of forming a component (e.g. reaction shell 700, 800, 900) may include a series of hot forming steps in which the punch 1501 is removed to form a feature such as a tab face 1510. Such a method may be used when it is desired to bend the ultra-high strength steel to the chosen geometry (e.g. forming a tab face 1510). FIGS. 22A-22E show, for example, a cross-section of the first reaction shell 700 shown in FIG. 16B. The method begins with heating a blank or unfinished shape 1500 (e.g. predetermined tubular shape) in a forming tool 1504 (FIG. 22A). According to an aspect of the disclosure, the blank 1500 is heated to approximately 900° C. Next, forming a tab face 1510 into unfinished shape 1500 by turning an edge into face 1510 by pressing a punch 1501 through (FIG. 22B). The forming occurs while the unfinished shape 1500 is hot. As shown in FIG. 22C, the method proceeds with completing the forming of the tab face 1510 by completely following through with the punch 1501. The next steps of the method is removing the punch 1501 and quenching the unfinished shape 1500 and retaining the tooling 1504 in contact with the blank 1500 (FIG. 22D). The final part 1508 is best shown in FIG. 22E.

Figure 23A:
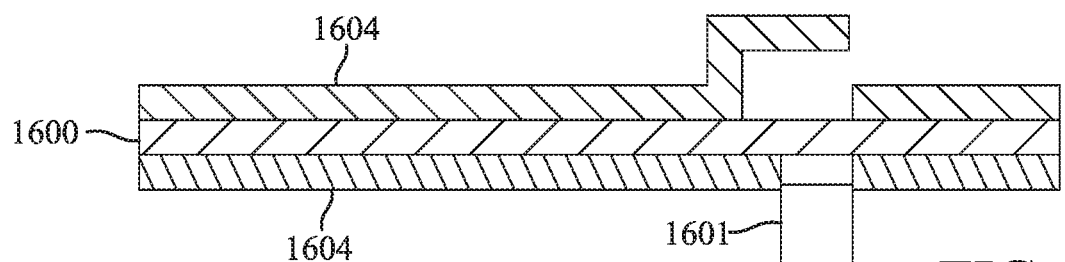
FIGS. 23A-23E shows a method of forming a component in accordance with the disclosure and illustrated with cross-sectional views of the first reaction shell along I-I of FIG. 16B.
Figure 23B:
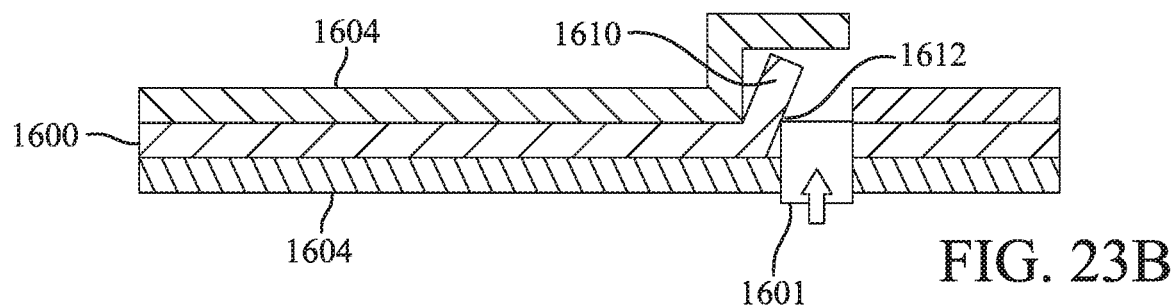
Figure 23C:
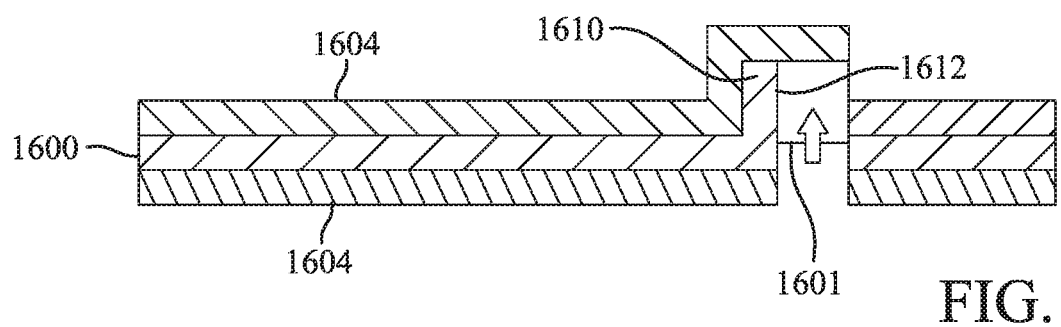
Figure 23D:
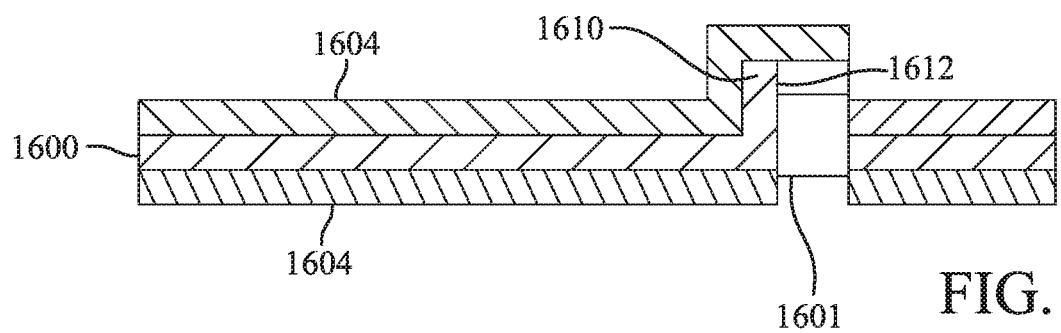
Figure 23E:
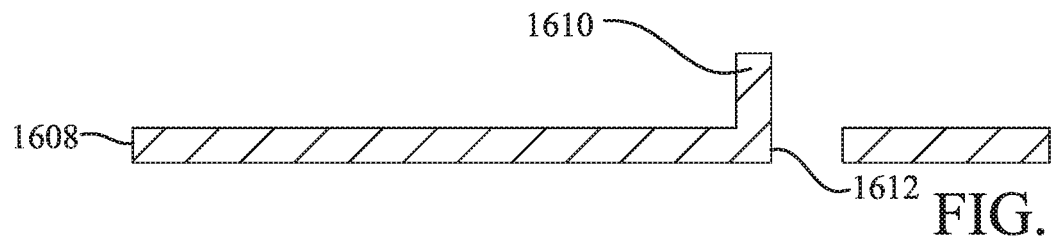

As best shown in FIGS. 23A-23E, a method of forming a component (e.g. reaction shell 700, 800, 900) may include a series of hot forming steps in which the punch 1601 is held in place to form a feature such as a tab hole 1612. Such a method may be used when it is desired to bend the ultra-high strength steel to the chosen geometry (e.g. forming a tab hole 1612). FIGS. 23A-23E show, for example, a cross-section of the first reaction shell 700 shown in FIG. 16B. The method begins with heating a blank 1600 or unfinished shape (e.g. predetermined tubular shape) in a forming tool 1604 (FIG. 23A). According to an aspect of the disclosure, the blank 1600 is heated to approximately 900° C. Next, forming a tab hole 1612 into unfinished shape by turning an edge into a tab face 1610 by pressing a punch 1601 through and shearing one side of the unfinished part 1600 (FIG. 23B). The forming occurs while the unfinished shape 1600 is hot. As shown in FIG. 23C, the method proceeds with completing the forming of the tab hole 1612 by completely following through of the punch 1601 and holding the punch 1601 in place. The method continues by quenching the unfinished shape 1600 and retaining the tooling 1604 in contact with the blank 1600 while the punches 1601 are in contact with the unfinished part 1600 (FIG. 23D). By holding the punches 1601 in place, they may assist with the quenching as long as the geometry allows and no binding will occur. The method concludes with removing the punches 1601 after cooling. The final part 1608 is best shown in FIG. 23E.

Figure 24A:
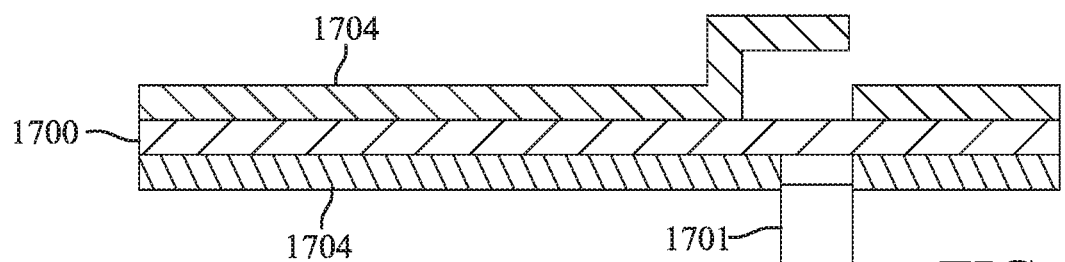
FIGS. 24A-24E shows a method of forming a component in accordance with the disclosure and illustrated with cross-sectional views of the first reaction shell along I-I of FIG. 16B.
Figure 24B:
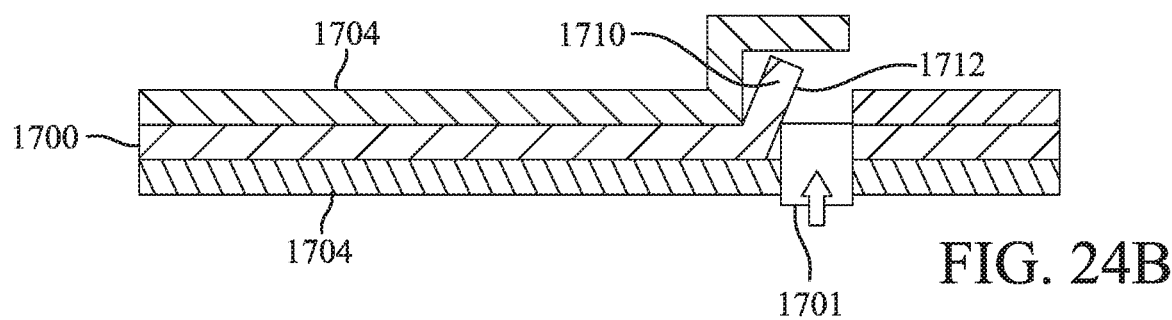
Figure 24C:
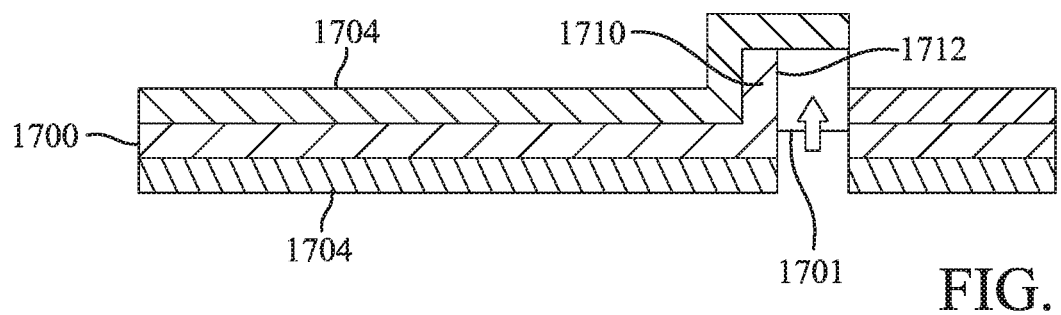
Figure 24D:
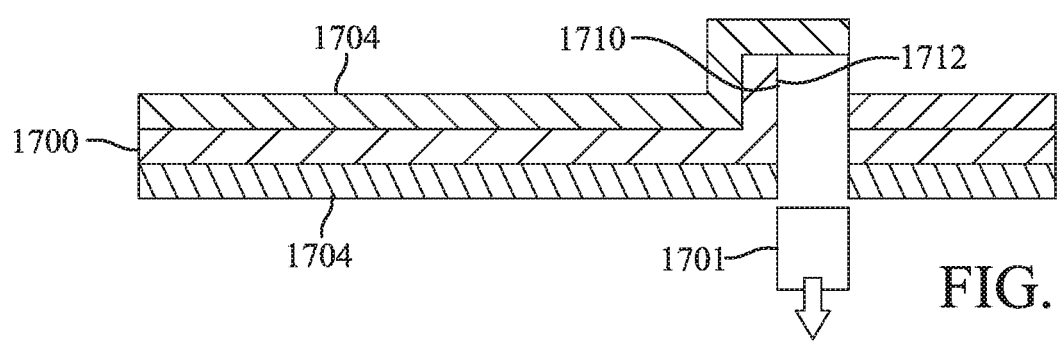
Figure 24E:
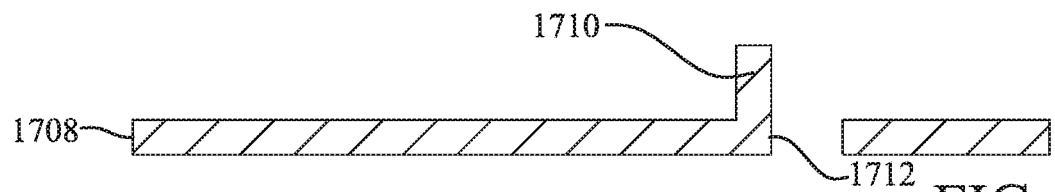

As best shown in FIGS. 24A-24E, a method of forming a component (e.g. reaction shell 700, 800, 900) may include a series of hot forming steps in which the punch 1701 is removed to form a feature such as a tab hole 1712. Such a method may be used when it is desired to bend the ultra-high strength steel to the chosen geometry (e.g. forming a tab hole 1712). FIGS. 24A-24E show, for example, a cross-section of the first reaction shell 700 shown in FIG. 16B. The method begins with heating a blank 1700 or unfinished shape (e.g. predetermined tubular shape) in a forming tool 1704 (FIG. 24A). According to an aspect of the disclosure, the blank 1700 is heated to approximately 900° C. Next, forming a tab hole 1712 into unfinished shape 1700 by turning an edge into a tab face 1710 by pressing a punch 1701 through and shearing one side of the unfinished part 1700 (FIG. 24B). The forming occurs while the unfinished shape 1700 is hot. As shown in FIG. 24C, the method proceeds with completing the forming of the tab hole 1712 by completely following through with the punch 1701. The next steps of the method is removing the punch 1701 and quenching the unfinished shape 1700 and retaining the tooling 1704 in contact with the blank 1700 (FIG. 24D). The final part 1708 is best shown in FIG. 24E.

It should be appreciated that the views illustrated in FIGS. 21A-24E, depict only a cross-section of half of a cylindrical part (e.g. the reaction shell 700, 800, 900). It should be appreciated that each of the method steps illustrated, the punch, and tooling geometry is generically shown as sharp edges, but may include a radius rather than a sharp edge. It should also be understood that while the steps may be carried out with part of a tubular shape, the method may also be used for other parts of components, such as those described herein, or having other general shapes, including flat sheets.

An example of a hot form tab hole 1812 application as disclosed herein is illustrated by FIGS. 25A-25D. Specifically, FIG. 25A shows a punch 1801 piercing to form a tab hole 1812 with a radius 1814 (FIG. 25B) rather than a sharp edge. Such a radius 1814 may be useful to act as a fulcrum, for example, for a clutch apply lever 1816 (FIG. 25B). FIG. 25C illustrates a clutch drum assembly 1818 in which such the tab hole 1812 may be utilized. FIG. 25D shows a cross-section of the clutch drum assembly 1818 shown in FIG. 25C. Specifically, the clutch housing assembly 1818 may contain clutch plates 1820, the clutch apply lever 1816, and a clutch ball ramp 1822. The hot form tab hole 1812 that is advantageously formed by methods described herein may be engaged by the clutch apply lever 1816, for example. The longer the drum, the more difficult it is to pull part off fixed ID mandrel. For example, pulling the part off may require a moving tooling.

In each embodiment of the present disclosure, the components may be formed from 22MnB5 steel, however, it should be understood that the amount of boron (B5-B50) may be selected depending on the type of component or strength desired. Additionally, the amount of other materials which comprise the ultra-high strength steel, such as carbon, may cause variation in the martensitic percentage and hardness after quenching. During the heat treatment, the heating temperature may be approximately 850-950° C. More specifically, the target heating temperature for 22MnB5 steel is 900° C.; however, the heating temperature may be increased as the amount of boron is increased. As described above, the heat treating may be partially or completely localized. The heating method may be induction or by other techniques. Preferably, the heating is in an inert atmosphere. When it is desirable to localize strength in one particular area of a component, the heat treatment may be localized to that area. In other instances, localized heat treatment may be used for sections of a component having a thicker cross section.

During the quenching step that may be used in forming each embodiment of the present disclosure, the quench press/die defines the final shape of the part. The release temperature may range between approximately 150-250° C., with a preferred target temperature of 200° C. The components generally remain in the quench press/die for approximately 6-20 seconds depending on the cross sectional thickness and desired strength.

In general, materials having a strength of approximately 1000 Mpa will crack or spring back during cold forming, therefore the methods described in the present disclosure are advantageous when forming such high strength materials. Additionally, due to a reduction of cross section, the geometry of components formed with heat assisted calibration (HAC) methods disclosed herein may be more complex (e.g. ribs). Consequently, the manufacturing of some components (e.g. planetary carrier described in the fifth embodiment above) that may not be possible using cold forming is made possible with HAC processes described herein.

Current hot forming of boron steel can also be focused on structural components with shapes and features designed to join and interact with a vehicle structure. These features are formed with die components that are for the most part stationary during the hot forming process step. They are also larger features in general with greater tolerances. However, within a transmission or driveline component, tolerances are significantly tighter (on the order of 5 to 10×) and their accuracy determines how well they perform in interacting with mating components. Torque transmitting features, such as splines, are especially critical as torque transmitting interfaces and are tightly controlled.

Conventional techniques for hot spline forming, such as drawing over a mandrel, are not effective at forming complete spline profiles especially with longer spline teeth. They also result in excess material thickness as a more uniform tooth section is created. Additionally spline tip and root radii are large reducing the effective radial spline length (interface surface).

Another disadvantage of using a fixed tool process is that the longer the splined component is, the more difficult to pull component off a fixed ID mandrel. Extraction becomes difficult due to complex part geometry making component extraction after hot forming and cooling of the part difficult. This also results in excessive tool wear and shortened tool life.

In accordance with the present disclosure, a solution is to utilize tool movement from the OD of the part, the ID of the part, or in both directions to generate detailed spline geometry. This also enables the component to be formed with a long effective spline length and varied part cross section to minimize weight. This also minimized tooth tip and root radii and results in a larger effective tooth radial surface which enables the component to be designed with a shorter overall tooth height as compensation for large radii is not required.

The process of the present disclosure, in various embodiments thereof, is described with process flow diagrams, and images provided in FIGS. 26-35. Generally, the solution is focused on the movement of tool segments to form spline teeth and other complex geometries within the part in conjunction with HAC processing. All splines and features are formed simultaneously using segments located 360 degrees around the part. Components can be die formed from round blanks, rectangular blanks, or pre-machined forgings. Blanks flat or formed with/without other features prior to HAC can be used. Tooth geometry is specific if done by cam die. Cam Die technology allows flexibility in spline angle design. Spline lengths of 30-40 mm. are typical and longer splines can be produced with sufficient press force and tool length. Involute spline geometry is also possible because of active tool movement resulting in nearly no drag on the part.

In general, the images provided in the drawings include tooling motion with the following options: 1) OD forming via segmented cam die tooling, rolling, etc., fixed mandrel; 2) ID forming via segmented cam die or other methods—fixed tool OD; or 3) ID+OD forming provides most flexibility by having fully active tool elements.

The above can also include the option of OD forming of the splines using a Roller die. The teeth would be formed by the roller and allowed to cool without roller contact. If parts are formed with roller die—there will be a mark on the tip of the spline tooth along the axial length. With the roller die forming option, there is also the possibility to roller die form the spline while the component is supported by an expanding mandrel and passing into a secondary portion of the tool that will collapse around the component and subsequently quench.

Cooling/Quenching can be either done utilizing a number of methods. For example, the method may include In Die using cooling channels or In Die using direct quench with a fluid flush in the tool. The method may include the part being ejected after hot forming and quenched in a fluid bath. The part may also be formed with all features prior to heating to an austenization temperature, after which point it is heated and cooled in a fluid bath.

Metallurgical differences can be noted based on rate of cooling combined with plastic deformation primarily in the spline formed features or other features formed during the hot stamping process step. It can allow for differentiation from parts that are simply heated and quenched without forming—be it in die or in a fluid medium.

Tightly tolerance part features such as splines be formed using the HAC process. Using the HAC process results in extremely strong parts that perform very well with mating components. Good part definition allows for optimization to reduce weight which results in reduced rotating inertia and component mass—reducing overall transmission weight and increasing efficiency.

Figure 26:
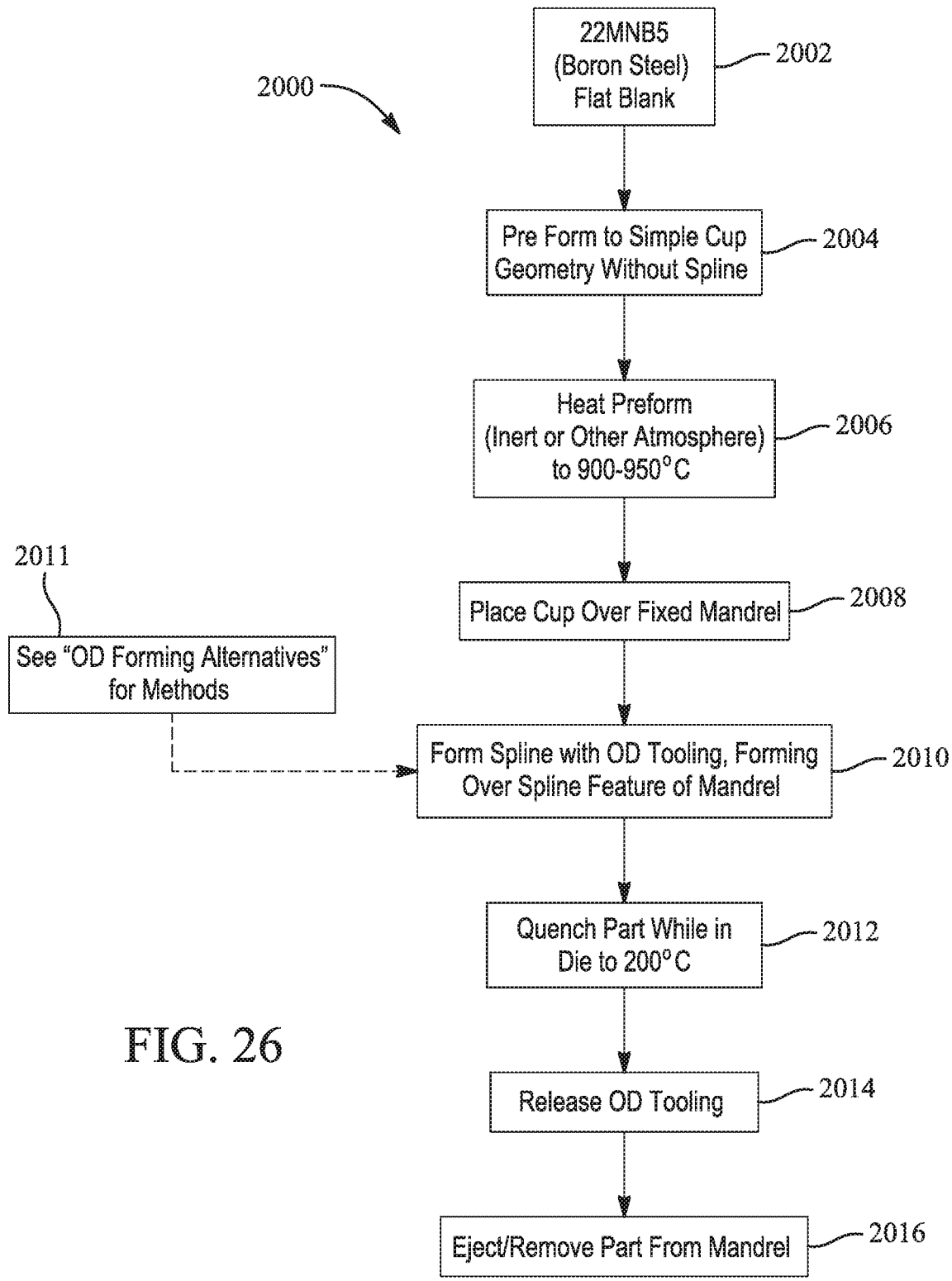
FIG. 26 is a diagrammatic illustration of a spline forming process for torque transmitting components embodying the teachings of the present disclosure.
Figure 27A:
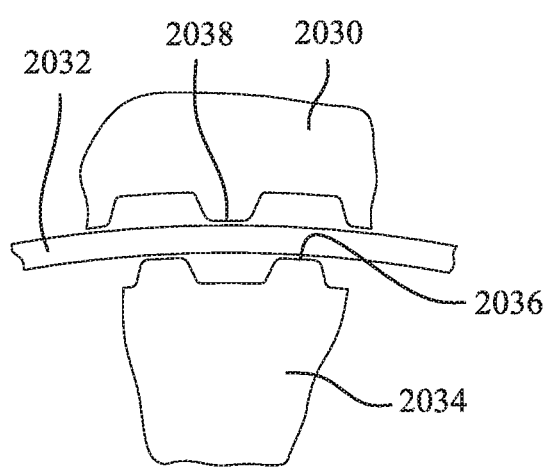
FIGS. 27A-27D illustrates an OD spline forming alternative for the process shown in FIG. 26.
Figure 27B:
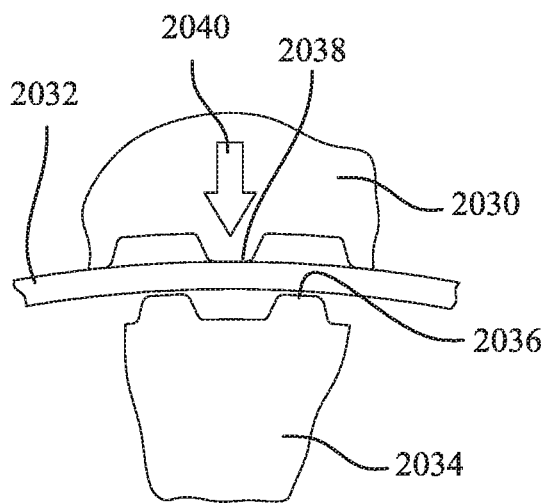
Figure 27C:
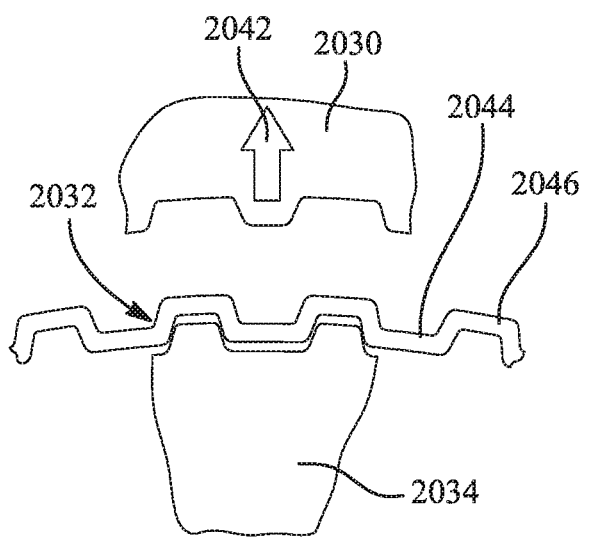
Figure 27D:
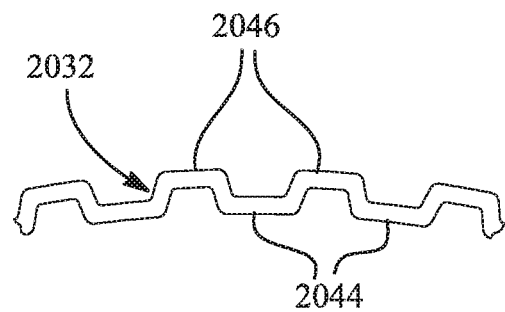

Referring now to FIG. 26, a spline forming process for torque transmitting components made from ultra-high strength steel (such as Boron steel) is disclosed and generally identified by reference numeral 2000. Those skilled will appreciate that splines formed according to this process 2000 can be formed on a plurality of torque transmitting components which can be of any type of component previously disclosed in reference to FIGS. 1 through 25. In each instance, the splines formed according to process 2000 will encircle or surround, completely or partially, a tubular segment of the component, with such segment configured to subsequently be spline-engaged with another component having either external or internal mating spline teeth. It is intended that spline forming process 2000 is an alternative to the spline forming methods disclosed with reference to FIGS. 4-7 for the purpose of now forming the spline teeth prior to the quenching operation.

Spline forming process 2000 is initiated with a first step 2002 of providing a flat blank of ultra-high strength steel. A second step 2004 of the process includes forming a cup-shaped preform without splines. In a third step 2006, the preform is heated to a predetermined temperature which, in this non-limiting instance, is in the range of 900-950° C. While an inert atmosphere is preferred for this preform heating step, those skilled will appreciate that the present invention is not limited thereto. According to a fourth step 2008 of the spline forming process, the heated cup-shaped preform is installed on a "fixed" mandrel of a spline forming die or tool set. Thereafter, at a fifth step 2010, an OD tooling segment of the spline forming tool set is activated to engage the cup-shaped preform and deform the preform over a spline feature associated with an outer surface of the fixed mandrel. Subsequently, the spline-formed component is quenched (while retained in the closed die set) to a predetermined temperature which, in this non-limiting example, is about 200° C., as indicated by a sixth step 2012 of the process. In a seventh step 2014, the OD tooling segment of the die set is retracted/released so as to subsequently permit the spline-formed component to be ejected/removed from the fixed mandrel, as indicated by eighth step 2016. The cup-shaped component manufactured pursuant to this HAC and spline forming process includes a continuous periphery of splines configured to mate with another component.

Step 2010 of the spline forming/HAC process 2000 of FIG. 26 is shown to include an "alternatives" block 2011, an example of which is shown in FIG. 27. The OD forming alternative utilizes a series of "segmented" OD tools 2030 arranged to form 360° of simultaneous spline forming of a cup-shaped pre-formed hub 2032. The cup-shaped pre-formed hub 2032 is shown surrounding a fixed mandrel 2034 which has spline features 2036 formed thereon and which are alternately aligned with spline features 2038 formed in each of OD tool segments 2030. In FIG. 27A, the heated cup-shaped pre-formed hub 2032 is placed over fixed mandrel 2034 with each of the OD tool segments 2030 located in a retracted position relative to mandrel 2034. FIG. 27B illustrates (via arrow 2040) a radially-inwardly directed press force being applied by OD tool segments 2030 for radially deforming cup-shaped preform 2032 relative to spline features 2036, 2038 for the purpose of forming net-shaped spline teeth. FIG. 27C illustrates (via arrow 2042) movement of OD tool segment 2030 to its retracted position relative to mandrel 2034 following the in-tool quenching operation. Cup-shaped preform 2032 is shown to include a continuous tubular rim segment defining, in this non-limiting example, internal spline teeth 2044 and external spline teeth 2046. FIG. 27D illustrates a removal/ejection of the finished spline-formed component from the mandrel.

Figure 28:
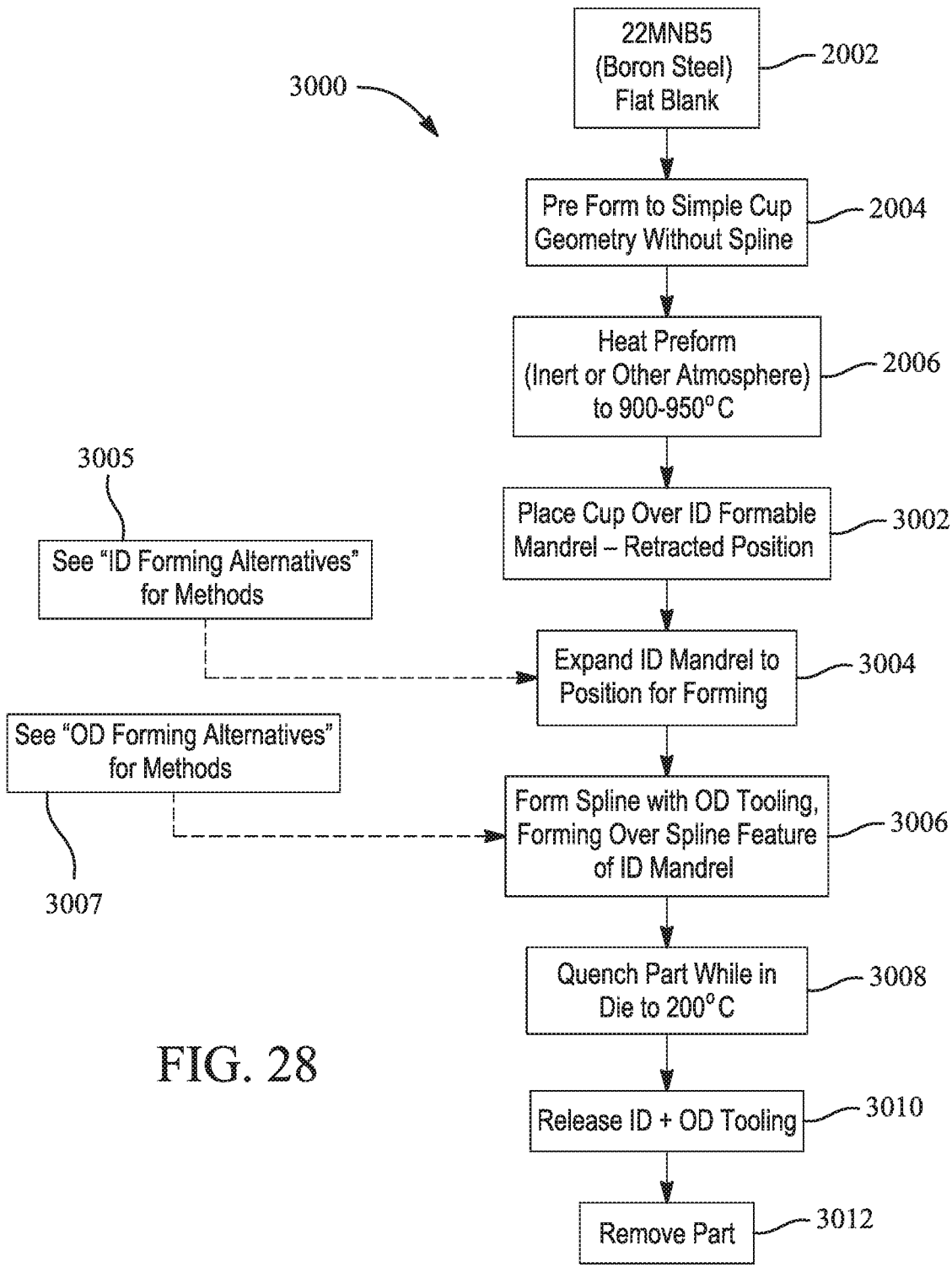
FIG. 28 is a diagrammatic illustration of another spline forming process for torque transmitting components also embodying the teachings of the present disclosure.

Referring now to FIG. 28, a modified version of spline forming process 2000 of FIG. 26 is now identified by reference numeral 3000. Steps of spline forming HAC process 3000 that are similar to those of process 2000 are identified via common reference numerals. In general, process 3000 differs from process 2000 in that a fixed mandrel is not used, but rather a segmented "expandable" mandrel (i.e. ID tool segments) is used in conjunction/cooperation with OD tool segments 2030.

In a first step 2002 of spline forming HAC process 3000, a flat blank of ultra-high strength steel (boron steel) is provided. At second step 2004, the blank is formed into a cup-shaped preform without splines. At third step 2006, the cup-shaped preform is heated in an inert environment to a predetermined temperature which, in this non-limiting example, again ranges between 900-950° C. Thereafter, the heated preform is placed over the expandable mandrel located in its retracted position, as indicated by fourth step 3002. Pursuant to a fifth step 3004 of spline forming process 3000, the ID tooling segments of the mandrel are moved from their retracted position to a ready position engaging the inner surface of the cup-shaped preform. At a sixth step 3006, the OD tooling segments of the die set are expanded radially inwardly, alone or in conjunction with radially outward expansion of the ID tooling segments of the mandrel, so as to form spline teeth in cup-shaped preform with spline features associated with the mandrel and OD tool segment. A seventh step 3008 provides a quenching operation with the spline-formed component. An eighth step 3010 is the operation for releasing (radially moving the ID and/or OD tooling segments such that the spline-formed component can be removed from the die set as shown at step 3012.

Step 3004 of the spline forming/HAC process 3000 of FIG. 28 is shown to include an "alternatives" block 3005 while step 3006 of the same process is shown to include an "alternatives" block 3007. These ID forming and OD forming alternatives are shown in one particular, but non-limiting, example in FIG. 29. As before, the OD forming alternative utilizes a series of segmented OD tools 2030 having spline form features 2038 and which are arranged to encircle the tubular cup-shaped preform 2032 to simultaneously form 360° of splines. However, FIG. 29 shows that the mandrel or ID tool utilizes a series of segmented ID tools 2034' each having a spline form feature 2036' and which are arranged to be encircled by cup-shaped preform 2032 and be simultaneously expanded radially. In FIG. 29A, both OD tool segments 2030 and ID tool segments 2034' are retracted (relative to preform 2032). FIG. 29B illustrates an inward press force (arrow 2040) exerted on OD tool segments 2030 and an outward press force (arrow 2050) exerted on ID tool segments 2034'. This simultaneous movement of the OD and ID tool segments act to radially deform cup-shaped preform relative to spline features 2036', 2038 for the purpose of forming net-shaped spline teeth. FIG. 29C illustrates via arrows 2042 and 2052 respective radial movement of OD tool segments 2030 and ID tool segments 2034' to their retracted positions following the in-tool quenching operation. Cup-shaped preform 2032 is now shown to include a continuous rim segments defining internal spline teeth 2044 and external spline teeth 2046. FIG. 29D illustrates the finished spline-formed component following removal from the tool/die set.

FIG. 30 illustrates splines 4000 formed using a conventional technique referred to as "ironing." To improve upon the prior art, the OD tool segments associated with the OD forming of the present disclosure use segmented cam die tooling or segmented rolling die tooling. Obviously, the ID tool segments associated with ID spline forming of the present disclosure can also use similar segmented cam die or rolling die tooling. An example of a spline form 4002 generated using OD tooling segments embodying the present disclosure is shown in FIG. 31. This spline form 4002, when compared to "ironed" spline form 4000, illustrates a non-uniform wall thickness and greater corner radiuses.

Figure 32:
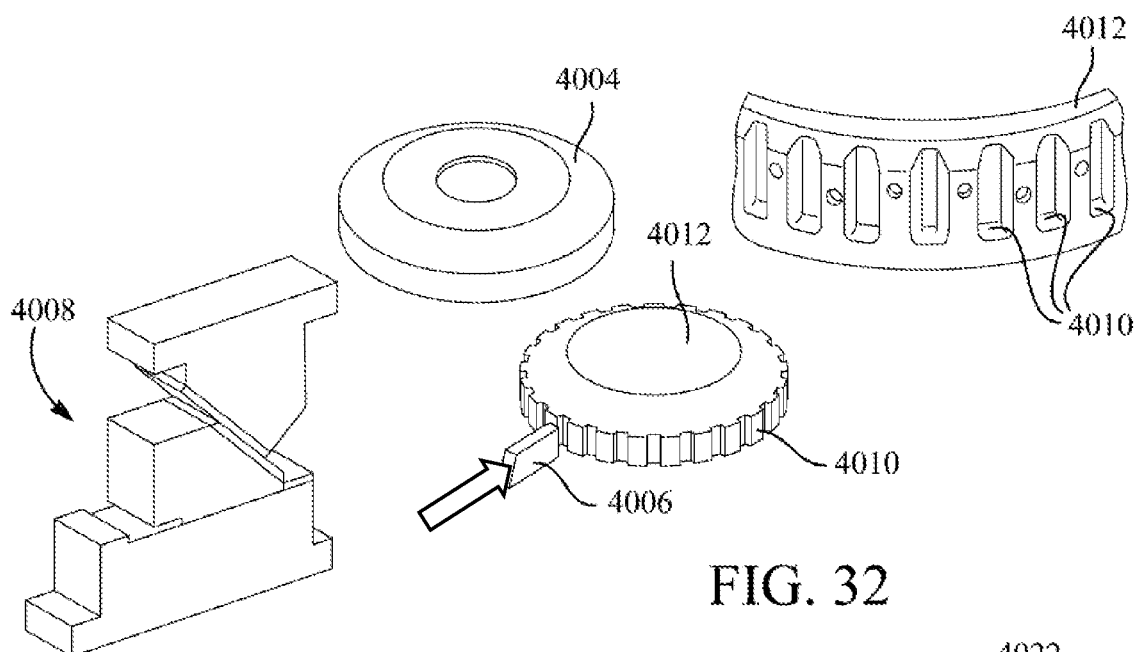
FIG. 32 illustrates a series of views for a cam die spline forming process that may be employed for any of the ID and OD spline forming alternatives associated with the present disclosure.
Figure 33:
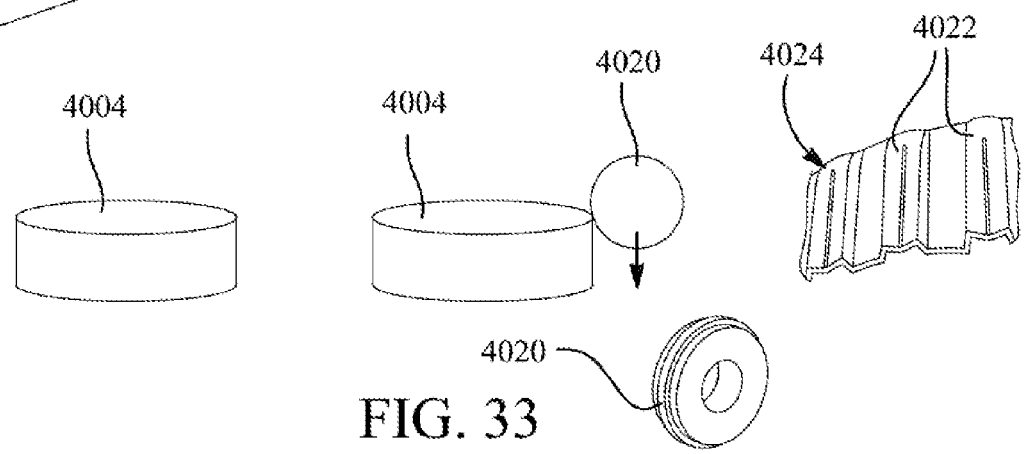
FIG. 33 illustrates a series of views for an OD forming alternatives for spline forming using a Roller Die process.
Figure 34:
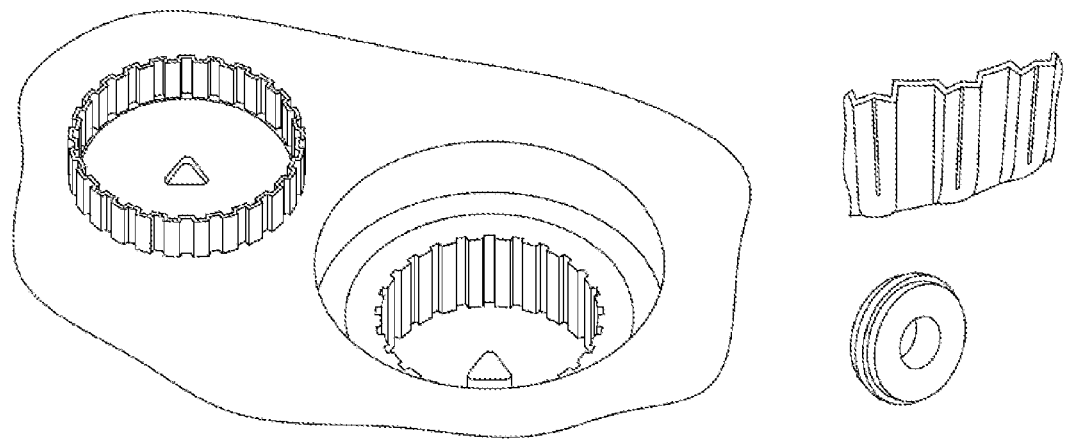
FIG. 34 illustrates additional views associated with the Roller Die spline forming process.

FIG. 32 illustrates a cam die spline forming (using the process of FIGS. 26 and 27) process having a plurality of OD cam die tool segments. Preform 4004 is heated and segmented OD cam die tool segments 4006 (one shown) move within a cam slide tool set 4008 to generate external splines 4010 in finished component 4012. Alternatively, FIG. 33 illustrates a roller die spline forming (using the OD forming process of FIGS. 26 and 27) process having a plurality of OD roller die tool segments. Preform 4004 is heated and roller die tool segments 4020 (one shown) move axially and radially relative to preform 4004 to generate external splines 4022 in finished component 4024. Another view of Roller Die Spline form processing is shown in FIG. 34.

Figure 35A:
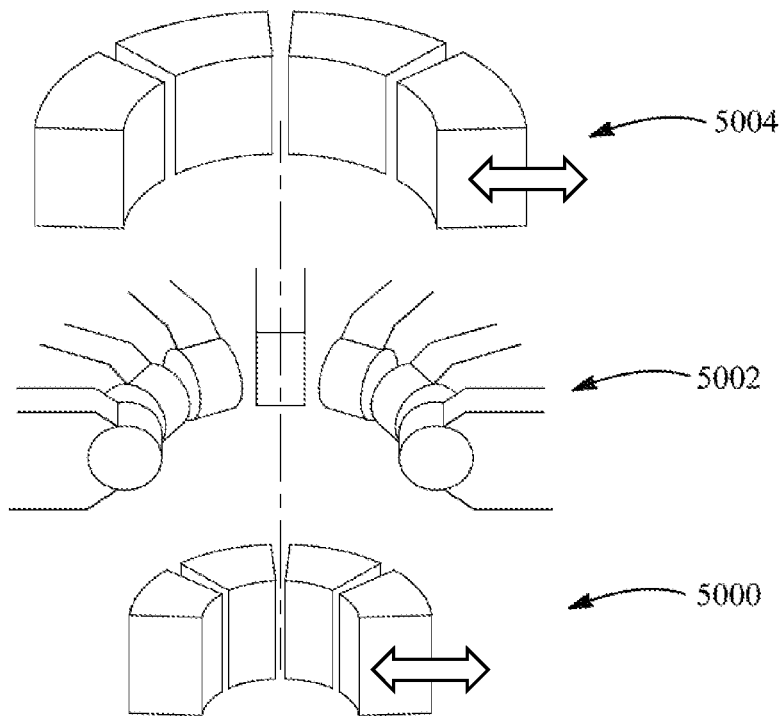
FIGS. 35A-35C illustrates a series of views associated with a HAC Roller Die spline forming process embodying the teachings of the present disclosure.
Figure 35C:
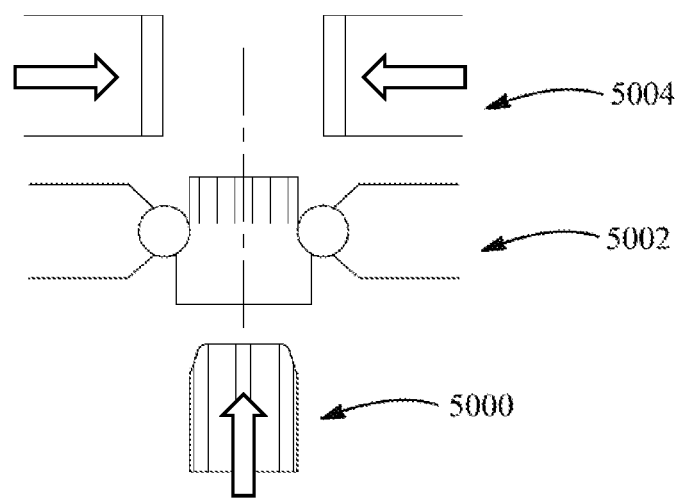
Figure 35B:
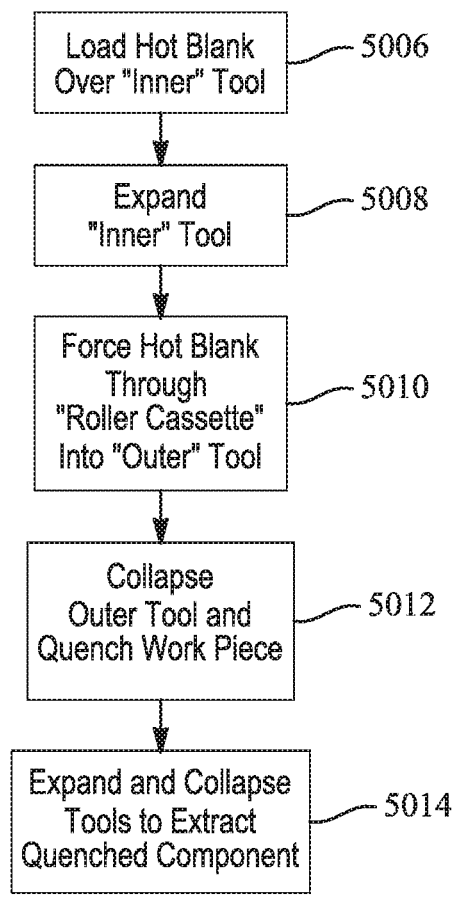

FIGS. 35A-35C illustrate a HAC-Roller Die Forming process. FIG. 35A defines that a segmented radially-moveable inner tool 5000, a fixed roller cassette 5002, and a segmented radially-movable outer tool 5004 cooperate to establish this process. FIG. 35B defines a series of process steps 1-5 associated with the tool set of FIG. 35A. At step 5006, the hot blank is loaded over the "inner" tool. At step 5008, the "inner" tool expands. At step 5010, the hot blank is forced through the "roller cassette" into the "outer" tool. At step 5012, the "outer" tool and the quench work piece collapse. At step 5014, the tools to extract the quenched component expand and collapse. Finally, FIG. 35C illustrates various positions 1-3 associated with the process of FIG. 35B. The intention of this configuration is to allow features to be formed by rollers similar to cold roller forming, but while the blank is hot. The addition of tool 5004 to maintain contact immediately after the roller operation in conjunction with tooling 5000 to remain in contact and maintaining the geometry while cooling. Without tool 5004 in place after the rolling process the blank would attempt to spring back to its original shape after rolling. Moveable tooling allows release of final part after cooling without issue.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with an example switching system can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer, or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the components in use or operation in addition to the orientation depicted in the figures. For example, if the component in the figures is turned over, elements described as "below" or "beneath" other elements or features would then be oriented "above" the other elements or features. Thus, the example term "below" can encompass both an orientation of above and below. The component may be otherwise oriented (rotated degrees or at other orientations) and the spatially relative descriptions used herein interpreted accordingly.

While examples of the disclosure have been illustrated and described, it is not intended that these examples illustrate and describe all possible forms of the disclosure. Rather, the words used in the specification are words of description rather than limitation, and it is understood that various changes may be made without departing from the spirit and scope of the disclosure. Additionally, the features and various implementing embodiments may be combined to form further examples of the disclosure.

What is claimed is:

1. A method for forming splines in a component utilizing ultra-high strength steel including the steps of:
   providing a flat blank of ultra-high strength steel;
   forming the flat blank into an unfinished shape of a component;
   heating the unfinished shape of the component;
   forming a finished shape of the component including splines using a quenching die having a radially-movable segmented tool;
   moving the radially moveable segmented tool of the quenching die radially inward from a radially retracted position to a radially inward position and maintaining the segmented tool in the radially inward position during quenching over a predetermined period of time; and
   forming circumferentially adjacent splines of the finished shape simultaneously during the predetermined period of time in which the segmented tool is maintained in the radially inward position.

2. The method of claim 1, further comprising:
   providing an inert atmosphere; and
   heating the unfinished shape of the component in the inert atmosphere.

3. The method of claim 2, wherein the step of heating the unfinished shape of the component in the inert atmosphere is further defined as heating the unfinished shape of the component in the inert atmosphere at a temperature between 850° C. and 950° C.

4. The method of claim 1, wherein the step of heating the unfinished shape of the component is further defined as heating the unfinished shape of the component at a temperature between 850° C. and 950° C.

5. The method of claim 1, wherein the step of forming the flat blank into an unfinished shape of a component is further defined as forming the flat blank into a cup-shaped preform without splines.

6. The method of claim 5, further comprising:
installing the cup-shaped preform on a fixed mandrel, wherein the fixed mandrel includes splines.

7. The method of claim 6, wherein the step of installing the cup-shaped preform on a fixed mandrel further includes aligning the splines of the fixed mandrel alternately with splines of the radially-movable segmented tool.

8. The method of claim 6, wherein the step of installing the cup-shaped preform on a fixed mandrel further includes aligning the radially-movable segmented tool in a retracted position relative to the fixed mandrel.

9. The method of claim 1, wherein the step of forming a finished shape of the component using a quenching die is further defined as forming a finished shape of the component with splines using a quenching die while cooling the component to a temperature between 150° C. and 250° C.

10. The method of claim 1, wherein the step of forming a finished shape of the component using a quenching die is further defined as forming a finished shape of the component using a quenching die while forming a plurality of spline teeth in the component using the quenching die.

11. The method of claim 1, wherein the step of forming a finished shape of the component using a quenching die is further defined as arranging a series of radially-movable segmented tools to completely surround and encircle the component to form all splines simultaneously.

12. The method of claim 1, wherein the step of forming a finished shape of the component using a quenching die is further defined as forming the unfinished shape into a cylindrical shape having a radial ring portion and a cylindrical drum portion and forming a plurality of the spline teeth in the cylindrical drum portion of the clutch housing using the segmented die parts of the quenching die while forming the finished shape.

13. The method of claim 1, further comprising:
releasing the radially-movable segmented tool; and
removing the component.

14. The method of claim 1, wherein the flat blank of ultra-high strength steel is of the 22MnB5 ultra high strength steel type.

15. The method of claim 1, wherein the finished shape has at least one of a cylindrical body or a cup-shaped body.

16. A method for forming splines in a component utilizing ultra-high strength steel including the steps of:
providing a flat blank of ultra-high strength steel;
forming the flat blank into an unfinished shape of a component;
providing an inert atmosphere;
heating the unfinished shape of the component in the inert atmosphere;
forming a finished shape of the component including splines using a quenching die having at least one radially-movable segmented tool;
moving the radially moveable segmented tool of the quenching die radially inward from a radially retracted position to a radially inward position and maintaining the segmented tool in the radially inward position during quenching; and
forming the entire length of the splines while maintaining the segmented tool in a radially inward position.

17. The method of claim 1, further comprising simultaneously forming splines encircling the component around 360 degrees of the component, and forming the entire axial length of the splines while maintaining the segmented tool in the radially inward position during the predetermined period of time.

\* \* \* \* \*